US012593365B2

(12) United States Patent
Orsino et al.

(10) Patent No.: US 12,593,365 B2
(45) Date of Patent: Mar. 31, 2026

(54) USER EQUIPMENT AND METHOD IN A WIRELESS COMMUNICATIONS NETWORK

(71) Applicant: Telefonaktiebolaget LM Ericsson (publ), Stockholm (SE)

(72) Inventors: Antonino Orsino, Kirkkonummi (FI); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 18/259,775

(22) PCT Filed: Dec. 16, 2021

(86) PCT No.: PCT/SE2021/051270
§ 371 (c)(1),
(2) Date: Jun. 28, 2023

(87) PCT Pub. No.: WO2022/146218
PCT Pub. Date: Jul. 7, 2022

(65) Prior Publication Data
US 2024/0064838 A1     Feb. 22, 2024

Related U.S. Application Data

(60) Provisional application No. 63/131,339, filed on Dec. 29, 2020.

(51) Int. Cl.
*H04W 76/18*          (2018.01)
*H04W 40/36*          (2009.01)
*H04W 88/04*          (2009.01)

(52) U.S. Cl.
CPC ........... *H04W 76/18* (2018.02); *H04W 40/36* (2013.01); *H04W 88/04* (2013.01)

(58) Field of Classification Search
CPC ...... H04W 76/18; H04W 40/36; H04W 88/04
See application file for complete search history.

(56) References Cited

U.S. PATENT DOCUMENTS

2013/0089076 A1 * 4/2013 Olvera-Hernandez ......................
                                                      H04W 36/08
                                                        370/332
2014/0169223 A1 * 6/2014 Kampmann ............ H04L 45/22
                                                        370/258

(Continued)

FOREIGN PATENT DOCUMENTS

JP       2012090267 A  *  5/2012  ...... H04W 36/00837
WO       2014021764 A2    2/2014
WO       2021028807 A1    2/2021

OTHER PUBLICATIONS

International Search Report and Written Opinion, International Application No. PCT/SE2021/051270, Feb. 24, 2022, 11 pages.

(Continued)

*Primary Examiner* — Atique Ahmed
(74) *Attorney, Agent, or Firm* — Nicholson De Vos Webster & Elliott LLP

(57) ABSTRACT

A method performed by a remote User Equipment (UE) for handling a path switch failure of a connection in a wireless communications network. The remote UE detects the path switch failure. The path switch failure relates to a failure to switch path from a first path to a first network node, to a second path to a second network node. At least one path out of the first path and the second path comprises an indirect link. Upon detecting the path switch failure, the remote UE continues to apply a previous configuration for the connection that was used before the path switch was triggered. During continuing to apply the previous configuration, to recover from the path switch failure, the remote UE triggers a recovery procedure to continue the transmission. During (Continued)

One slot (14 symbols)

the recovery procedure, the connection for the first path is kept.

17 Claims, 17 Drawing Sheets

(56) References Cited

U.S. PATENT DOCUMENTS

| | | | |
|---|---|---|---|
| 2018/0249394 A1* | 8/2018 | Nilsson ............. | H04W 36/0085 |
| 2020/0037218 A1* | 1/2020 | Karampatsis ....... | H04W 36/087 |
| 2021/0136635 A1* | 5/2021 | Kim .................. | H04W 28/0263 |

OTHER PUBLICATIONS

3GPP TR 23.752 V0.3.0, "3rd Generation Partnership Project; Technical Specification Group Services and System Aspects; Study on system enhancement for Proximity based Services (ProSe) in the 5G System (5GS) (Release 17)" Jan. 2020, 73 pages, 3GPP Organizational Partners.
3GPP TS 23.287 V16.5.0, "3rd Generation Partnership Project; Technical Specification Group Services and System Aspects; Architecture enhancements for 5G System (5GS) to support Vehicle-to-Everything (V2X) services (Release 16)," Dec. 2020, 58 pages, 3GPP Organizational Partners.
3GPP TS 23.303 V16.0.0, "3rd Generation Partnership Project; Technical Specification Group Services and System Aspects; Proximity-based services (ProSe); Stage 2 (Release 16)," Jul. 2020, 130 pages, 3GPP Organizational Partners.
3GPP TS 23.501 V16.7.0, "3rd Generation Partnership Project; Technical Specification Group Services and System Aspects; System architecture for the 5G System (5GS); Stage 2 (Release 16)," Dec. 2020, 450 pages, 3GPP Organizational Partners.
3GPP TS 23.502 V16.7.0, "3rd Generation Partnership Project; Technical Specification Group Services and System Aspects; Procedures for the 5G System (5GS); Stage 2 (Release 16)," Dec. 2020, 603 pages, 3GPP Organizational Partners.
3GPP TS 36.331 V16.2.1, "3rd Generation Partnership Project; Technical Specification Group Radio Access Network; Evolved Universal Terrestrial Radio Access (E-UTRA); Radio Resource Control (RRC); Protocol specification (Release 16)," Sep. 2020, 1081 pages, 3GPP Organizational Partners.
Catt, "Service Continuity for L2 U2N Relay," Nov. 1-12, 2021, 4 pages, 3GPP TSG-RAN WG2 Meeting #116-e, R2-2109509, Electronic.
Huawei et al., "Summary of AI 8.7.2.2 Service continuity," Nov. 1-12, 2021, 21 pages, 3GPP TSG-RAN WG2 Meeting #116 electronic, R2-2111276, Electronic meeting.

* cited by examiner

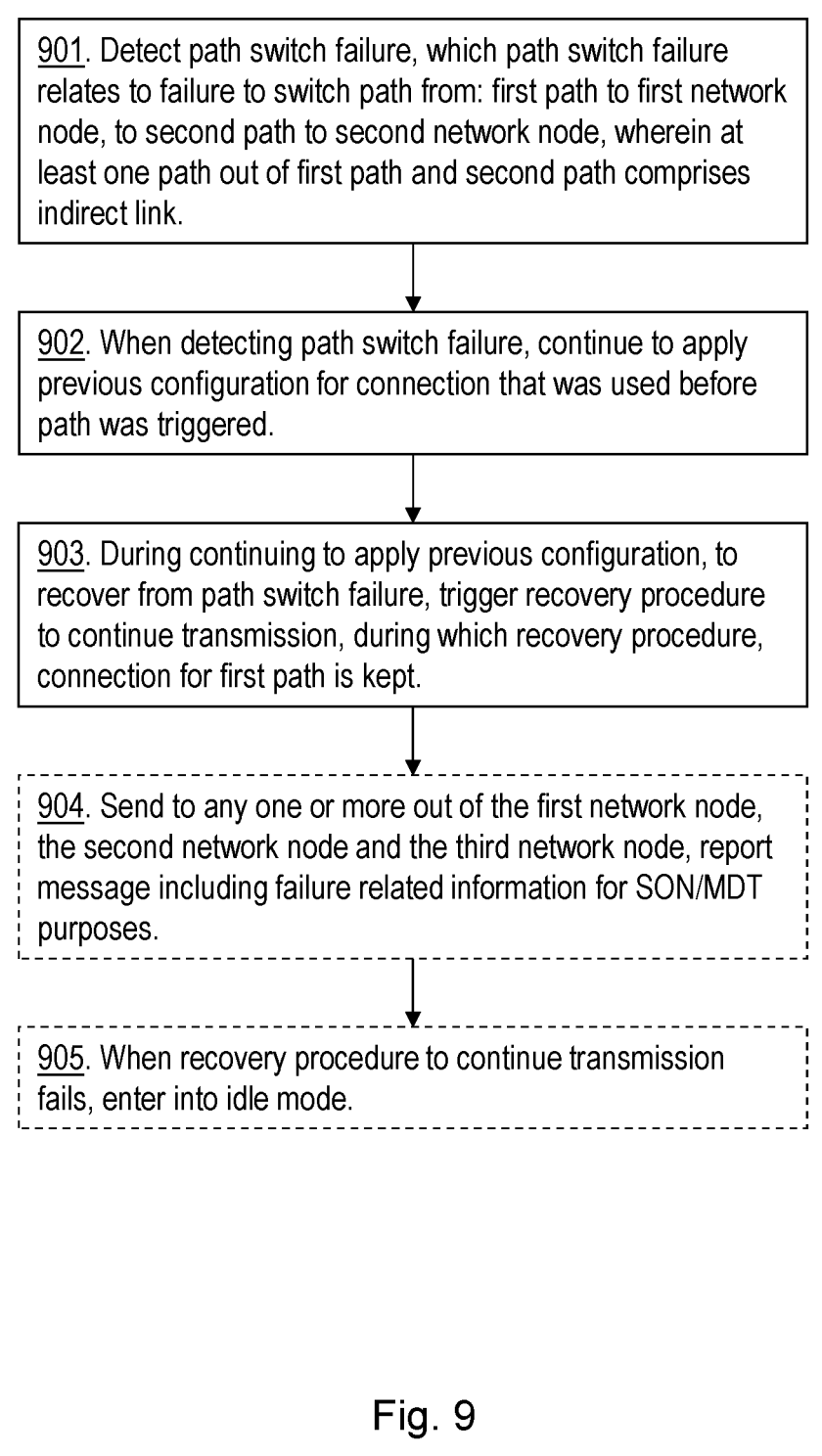

901. Detect path switch failure, which path switch failure relates to failure to switch path from: first path to first network node, to second path to second network node, wherein at least one path out of first path and second path comprises indirect link.

902. When detecting path switch failure, continue to apply previous configuration for connection that was used before path was triggered.

903. During continuing to apply previous configuration, to recover from path switch failure, trigger recovery procedure to continue transmission, during which recovery procedure, connection for first path is kept.

904. Send to any one or more out of the first network node, the second network node and the third network node, report message including failure related information for SON/MDT purposes.

905. When recovery procedure to continue transmission fails, enter into idle mode.

Fig. 9

USER EQUIPMENT AND METHOD IN A WIRELESS COMMUNICATIONS NETWORK

CROSS-REFERENCE TO RELATED APPLICATIONS

This application is a National stage of International Application No. PCT/SE2021/051270, filed Dec. 16, 2021, which claims priority to U.S. Provisional Application No. 63/131, 339, filed Dec. 29, 2020, which are hereby incorporated by reference.

TECHNICAL FIELD

Embodiments herein relate to a User Equipment (UE) and method therein. In some aspects, they relate to handling a path switch failure of a connection in a wireless communications network.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

NR Frame Structure

Similar to LTE, NR uses Orthogonal Frequency Division Multiplexing (OFDM) in the downlink (i.e. from a network node, gNB, eNB, or base station, to a user equipment or UE). The basic NR physical resource over an antenna port may thus be seen as a time-frequency grid as illustrated in FIG. 1, where a resource block (RB) in a 14-symbol slot is shown. FIG. 1 depicts an NR physical resource grid.

A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times2^\mu)$ kHz where $\mu\in(0,1,2,3,4)$. $\Delta f=15$ kHz is the basic (or reference) subcarrier spacing that is also used in LTE.

In the time domain, downlink and uplink transmissions in NR will be organized into equally-sized subframes of 1 ms each similar to LTE. A subframe is further divided into multiple slots of equal duration. The slot length for subcarrier spacing $\Delta f=(15\times2^\mu)$ kHz is $\frac{1}{2}^\mu p$ ms. There is only one slot per subframe for $\Delta f=15$ kHz and a slot consists of 14 OFDM symbols.

Downlink transmissions are dynamically scheduled, i.e., in each slot the gNB transmits Downlink Control Information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes PDCCH and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including Synchronization Signal/Physical Broadcast Channel block (SSB), Channel State Information Reference Signal (CSI-RS), etc.

Uplink data transmissions, carried on Physical Uplink Shared Channel (PUSCH), can also be dynamically scheduled by the gNB by transmitting a DCI. The DCI, which is transmitted in the downlink (DL) region, always indicates a scheduling time offset so that the PUSCH is transmitted in a slot in the uplink (UL) region.

Sidelink Transmissions in NR

Sidelink transmissions over NR are specified for 3GPP Release 16. These are enhancements of PROximity-based Services (ProSe) specified for LTE. Four new enhancements are particularly introduced to NR sidelink transmissions as follows:

Support for unicast and groupcast transmissions are added in NR sidelink. For unicast and groupcast, the Physical Sidelink Feedback Channel (PSFCH) is introduced for a receiver UE to reply the decoding status to a transmitter UE.

Grant-free transmissions, which are adopted in NR uplink transmissions, are also provided in NR sidelink transmissions, to improve the latency performance.

To alleviate resource collisions among different sidelink transmissions launched by different UEs, it enhances channel sensing and resource selection procedures, which also lead to a new design of the Physical Sidelink Control Channel (PSCCH).

To achieve a high connection density, congestion control and thus the Quality of Service (QoS) management is supported in NR sidelink transmissions.

To enable the above enhancements, new physical channels and reference signals are introduced in NR, available in LTE before:

Physical Sidelink Shared Channel (PSSCH), sidelink version of PDSCH: The PSSCH is transmitted by a sidelink transmitter UE, which conveys sidelink transmission data, system information blocks (SIBs) for radio resource control (RRC) configuration, and a part of the Sidelink Control information (SCI), sidelink version of DCI.

PSFCH, sidelink version of PUCCH: The PSFCH is transmitted by a sidelink receiver UE for unicast and groupcast, which conveys 1 bit information over 1 RB for the Hybrid Automatic Repeat Request (HARQ) acknowledgement (ACK) and the negative ACK (NACK). In addition, Channel State Information (CSI) is carried in the Medium Access Control (MAC) Control Element (CE) over the PSSCH instead of the PSFCH.

PSCCH, sidelink version of PDCCH: When the traffic to be sent to a receiver UE arrives at a transmitter UE, a transmitter UE should first send the PSCCH, which conveys a part of SCI to be decoded by any UE for the channel sensing purpose, including the reserved time-frequency resources for transmissions, demodulation reference signal (DMRS) pattern and antenna port, etc.

Sidelink Primary/Secondary Synchronization Signal (S-PSS/S-SSS): Similar to downlink transmissions in NR, in sidelink transmissions, primary and secondary synchronization signals, called S-PSS and S-SSS respectively, are supported. Through detecting the S-PSS and S-SSS, a UE is able to identify the sidelink synchronization identity (SSID) from the UE sending the S-PSS/S-SSS. Through detecting the S-PSS/S-SSS, a UE is therefore able to know the characteristics of the UE transmitting the S-PSS/S-SSS. A series of processes of acquiring timing and frequency synchronization together with SSIDs of UEs is called initial cell search. Note that the UE sending the S-PSS/S-SSS may not necessarily be involved in sidelink transmissions, and a node, e.g. UE, eNB, or gNB, sending the S-PSS/S-SSS is called a synchronization source. There are two S-PSS sequences and 336 S-SSS sequences forming a total of 672 SSIDs in a cell.

Physical Sidelink Broadcast Channel (PSBCH): The PSBCH is transmitted along with the S-PSS/S-SSS as a synchronization signal/PSBCH block (SSB). The SSB has the same numerology as PSCCH/PSSCH on that carrier, and an SSB should be transmitted within the bandwidth of the configured Bandwidth Part (BWP). The PSBCH conveys information related to synchronization, such as the Direct Frame Number (DFN), indication of the slot and symbol level time resources for sidelink transmissions, in-coverage indicator, etc. The SSB is transmitted periodically at every 160 ms.

DMRS, Phase Tracking Reference Signal (PT-RS), Channel State Information Reference Signal (CSIRS): These physical reference signals supported by NR downlink/uplink transmissions are also adopted by sidelink transmissions. Similarly, the PT-RS is only applicable for FR2 transmission.

Another new feature is the two-stage SCI. This a version of the DCI for SL. Unlike the DCI, only part, the first stage, of the SCI is sent on the PSCCH. This part is used for channel sensing purposes, including the reserved time-frequency resources for transmissions DMRS pattern and antenna port etc., and can be read by all UEs while the remaining, the second stage, scheduling and control information such as a 8-bits source identity (ID) and a 16-bits destination ID, NDI, RV and HARQ process ID, is sent on the PSSCH to be decoded by the receiver UE.

Similar as for ProSE in LTE, NR sidelink transmissions have the following two modes of resource allocations:

Mode 1: Sidelink resources are scheduled by a gNB.

Mode 2: The UE autonomously selects sidelink resources from a configured or preconfigured sidelink resource pool(s) based on the channel sensing mechanism.

For the in-coverage UE, a gNB can be configured to adopt Mode 1 or Mode 2. For the out-of-coverage UE, only Mode 2 can be adopted.

As in LTE, scheduling over the sidelink in NR is done in different ways for Mode 1 and Mode 2.

Mode 1 supports the following two kinds of grants:

Dynamic grant: When the traffic to be sent over sidelink arrives at a transmitter UE, this UE should launch the four-message exchange procedure to request sidelink resources from a gNB—SR on UL, grant, BSR on UL, grant for data on SL sent to UE. During the resource request procedure, a gNB may allocate a sidelink radio network temporary identifier (SL-RNTI) to the transmitter UE. If this sidelink resource request is granted by a gNB, then the gNB indicates the resource allocation for the PSCCH and the PSSCH in the DCI conveyed by PDCCH with CRC scrambled with the SL-RNTI. When a transmitter UE receives such a DCI, a transmitter UE can obtain the grant only if the scrambled CRC of DCI can be successfully solved by the assigned SL-RNTI. A transmitter UE then indicates the time-frequency resources and the transmission scheme of the allocated PSSCH in the PSCCH, and launches the PSCCH and the PSSCH on the allocated resources for sidelink transmissions. When a grant is obtained from a gNB, a transmitter UE can only transmit a single transmission block (TB). As a result, this kind of grant is suitable for traffic with a loose latency requirement.

Configured grant: For the traffic with a strict latency requirement, performing the four-message exchange procedure to request sidelink resources may induce unacceptable latency. In this case, prior to the traffic arrival, a transmitter UE may perform the four-message exchange procedure and request a set of resources. If a grant can be obtained from a gNB, then the requested resources are reserved in a periodic manner. Upon traffic arriving at a transmitter UE, this UE can launch the PSCCH and the PSSCH on the upcoming resource occasion. In fact, this kind of grant is also known as grant-free transmissions.

In both dynamic grant and configured grant, a sidelink receiver UE cannot receive the DCI since it is addressed to the transmitter UE, and therefore a receiver UE should perform blind decoding to identify the presence of PSCCH and find the resources for the PSSCH through the SCI.

When a transmitter UE launches the PSCCH, CRC is also inserted in the SCI without any scrambling.

In the Mode 2 resource allocation, when traffic arrives at a transmitter UE, this transmitter UE should autonomously select resources for the PSCCH and the PSSCH. To further minimize the latency of the feedback HARQ ACK/NACK transmissions and subsequently retransmissions, a transmitter UE may also reserve resources for PSCCH/PSSCH for retransmissions. To further enhance the probability of successful TB decoding at one shot and thus suppress the probability to perform retransmissions, a transmitter UE may repeat the TB transmission along with the initial TB transmission. This mechanism is also known as blind retransmission. As a result, when traffic arrives at a transmitter UE, then this transmitter UE should select resources for the following transmissions:

1) The PSSCH associated with the PSCCH for initial transmission and blind retransmissions.
2) The PSSCH associated with the PSCCH for retransmissions.

Since each transmitter UE in sidelink transmissions should autonomously select resources for above transmissions, how to prevent different transmitter UEs from selecting the same resources turns out to be a critical issue in Mode 2. A particular resource selection procedure is therefore imposed to Mode 2 based on channel sensing. The channel sensing algorithm involves measuring RSRP on different subchannels and requires knowledge of the different UEs power levels of DMRS on the PSSCH or the DMRS on the PSCCH depending on the configuration. This information is known only after receiver SCI launched by other UEs. The sensing and selection algorithm is rather complex.

Discovery Procedures

There are Device to Device (D2D) discovery procedures for detection of services and applications offered by other UEs in close proximity. This is part of 3GPP LTE Rel 12 and Rel 13. The discovery procedure has two modes, mode A based on open announcements, or broadcasts, and mode B, which is request/response based. The discovery mechanism is controlled by the application layer, ProSe. The discovery message is sent on the Physical Sidelink Discovery Channel (PSDCH) which is not available in NR. Also, there is a specific resource pool for announcement and monitoring of discovery messages. The discovery procedure may be used to detect UEs supporting certain services or applications before initiating direct communication.

Layer 3 (L3) UE-to-Network Relay

FIG. 2 depicts FIG. 6.6.1-1: Architecture model using a ProSe 5G UE-to-Network Relay in 3GPP TR 23.752. In the 3GPP TR 23.752 v0.3.0 clause 6.6, the layer-3 based UE-to-Network relay is described.

The ProSe 5G UE-to-Network Relay entity provides the functionality to support connectivity to the network for Remote UEs, as seen in FIG. 2. It may be used for both public safety services and commercial services, e.g. interactive service.

A UE is considered to be a Remote UE for a certain ProSe UE-to-Network relay if it has successfully established a PC5 link to this ProSe 5G UE-to-Network Relay. A Remote UE can be located within NG-RAN coverage or outside of NG-RAN coverage.

The ProSe 5G UE-to-Network Relay shall relay unicast traffic, in UL and DL, between the Remote UE and the network. The ProSe UE-to-Network Relay shall provide generic function that can relay any IP traffic.

One-to-one Direct Communication is used between Remote UEs and ProSe 5G UE-to-Network Relays for unicast traffic as specified in solutions for Key Issue #2 in the 3GPP TR 23.752 v0.3.0.

The protocol stack for Layer-3 UE-to-Network Relays is shown in FIG. 3 which depicts FIG. 6.6.1-2: Protocol stack for ProSe 5G UE-to-Network Relay in 3GPP TR 23.752.

Hop-by-hop security is supported in the PC5 link and Uu link. If there are requirements beyond hop-by-hop security for protection of Remote UE's traffic, security over IP layer needs to be applied.

Further security details, such as integrity and privacy protection for remote UE-Network communication, will be specified in 3GPP SA WG3.

A ProSe 5G UE-to-Network Relay capable UE may register to the network, if not already registered, and establish a PDU session enabling the necessary relay traffic, or it may need to connect to additional PDU sessions or modify the existing PDU session in order to provide relay traffic towards Remote UEs. PDU sessions supporting UE-to-Network Relay shall only be used for Remote ProSe UEs relay traffic.

FIG. 4 depicts FIG. 6.6.2-1: ProSe 5G UE-to-Network Relay in 3GPP TR 23.752.

0. During the Registration procedure, Authorization and provisioning is performed for the ProSe UE-to-NW relay and Remote UE. Authorization and provisioning procedure may be any solution for key issue #1 and #3 in the 3GPP TR 23.752 v0.3.0.

1. The ProSe 5G UE-to-Network Relay may establish a PDU session for relaying with default PDU session parameters received in step 0 or pre-configured in the UE-to-NW relay, e.g. S-NSSAI, DNN, SSC mode. In case of IPv6, the ProSe UE-to-Network Relay obtains the IPv6 prefix via prefix delegation function from the network as defined in 3GPP TS 23.501.

2. Based on the Authorization and provisioning in step 0, the Remote UE performs discovery of a ProSe 5G UE-to-Network Relay using any solution for key issue #1 and #3 in the 3GPP TR 23.752 v0.3.0. As part of the discovery procedure the Remote UE learns about the connectivity service the ProSe UE-to-Network Relay provides.

3. The Remote UE selects a ProSe 5G UE-to-Network Relay and establishes a connection for One-to-one ProSe Direct Communication as described in 3GPP TS 23.287.

If there is no PDU session satisfying the requirements of the PC5 connection with the remote UE, e.g. S-NSSAI, DNN, QoS, the ProSe 5G UE-to-Network Relay initiates a new PDU session establishment or modification procedure for relaying.

4. IPv6 prefix or IPv4 address is allocated for the remote UE as it is defined in 3GPP TS 23.303 clauses 5.4.4.2 and 5.4.4.3. From this point the uplink and downlink relaying can start.

5. The ProSe 5G UE-to-Network Relay sends a Remote UE Report (Remote User ID, IP info) message to the SMF for the PDU session associated with the relay. The Remote User ID is an identity of the Remote UE user, provided via User Info, that was successfully connected in step 3. The SMF stores the Remote User IDs and the related IP info in the ProSe 5G UE-to-Network Relay's for the PDU connection associated with the relay.

For IP info the following principles apply:
for IPv4, the UE-to-network Relay shall report TCP/UDP port ranges assigned to individual Remote UEs, along with the Remote User ID;
for IPv6, the UE-to-network Relay shall report IPv6 prefixes assigned to individual Remote UEs, along with the Remote User ID.

The Remote UE Report message shall be sent when the Remote UE disconnects from the ProSe 5G UE-to-Network Relay, e.g. upon explicit layer-2 link release or based on the absence of keep alive messages over PC5, to inform the SMF that the Remote UEs have left.

In the case of Registration Update procedure involving SMF change the Remote User IDs and related IP info corresponding to the connected Remote UEs are transferred to the new SMF as part of SM context transfer for the ProSe 5G UE-to-Network Relay.

NOTE 1: In order for the SMF to have the Remote UEs information, the HPLMN and the VPLMN where the ProSe 5G UE-to-Network Relay is authorised to operate, needs to support the transfer of the Remote UE related parameters in case the SMF is in the HPLMN.

NOTE 2: When Remote UEs disconnect from the ProSe UE-to-Network Relay, it is up to implementation how relaying PDU sessions are cleared/disconnected by the ProSe 5G UE-to-Network Relay.

After being connected to the ProSe 5G UE-to-Network Relay, the Remote UE keeps performing the measurement of the signal strength of the discovery message sent by the ProSe 5G UE-to-Network Relay for relay reselection.

The solution can also work when the ProSe 5G UE-to-Network Relay UE connects in EPS using LTE. In this case for the Remote UE report the procedures defined in 3GPP TS 23.303 can be used.

Layer 2 (L2) UE-to-Network Relay

In the 3GPP TR 23.752 v0.3.0 clause 6.7, the layer-2 based UE-to-Network relay is described.

General Information

In this clause, the protocol architecture supporting a L2 UE-to-Network Relay UE is provided.

The L2 UE-to-Network Relay UE provides forwarding functionality that can relay any type of traffic over the PC5 link.

The L2 UE-to-Network Relay UE provides the functionality to support connectivity to the 5GS for Remote UEs. A UE is considered to be a Remote UE if it has successfully established a PC5 link to the L2 UE-to-Network Relay UE. A Remote UE can be located within NG-RAN coverage or outside of NG-RAN coverage.

FIG. 5, depicting FIG. A.2.1-1: User Plane Stack for L2 UE-to-Network Relay UE in 3GPP TR 23.752, illustrates the protocol stack for the user plane transport, related to a PDU Session, including a Layer 2 UE-to-Network Relay UE. The PDU layer corresponds to the PDU carried between the Remote UE and the Data Network (DN) over the PDU session. The PDU layer corresponds to the PDU carried between the Remote UE and the DN over the PDU session. It is important to note that the two endpoints of the PDCP link are the Remote UE and the gNB. The relay function is performed below PDCP. This means that data security is ensured between the Remote UE and the gNB without exposing raw data at the UE-to-Network Relay UE.

The adaptation relay layer within the UE-to-Network Relay UE can differentiate between signalling radio bearers (SRBs) and data radio bearers (DRBs) for a particular Remote UE. The adaption relay layer is also responsible for mapping PC5 traffic to one or more DRBs of the Uu. The definition of the adaptation relay layer is under the responsibility of 3GPP RAN WG2.

FIG. 6, depicting FIG. A.2.2-1: Control Plane for L2 UE-to-Network Relay UE in 3GPP TR 23.752, illustrates the protocol stack of the NAS connection for the Remote UE to the NAS-MM and NAS-SM components. The NAS messages are transparently transferred between the Remote UE and 5G-AN over the Layer 2 UE-to-Network Relay UE using:

PDCP end-to-end connection where the role of the UE-to-Network Relay UE is to relay the PDUs over the signalling radio bear without any modifications.

N2 connection between the 5G-AN and AMF over N2.

N3 connection AMF and SMF over N11.

The role of the UE-to-Network Relay UE is to relay the PDUs from the signaling radio bearer without any modifications.

Procedures

FIG. 7 depicts FIG. 6.7.3-1: Connection Establishment for Indirect Communication via UE-to-Network Relay UE in 3GPP TR 23.752.

0. If in coverage, the Remote UE and UE-to-Network Relay UE may independently perform the initial registration to the network according to registration procedures in 3GPP TS 23.502. The allocated 5G GUTI of the Remote UE is maintained when later NAS signalling between Remote UE and Network is exchanged via the UE-to-Network Relay UE.

NOTE: The current procedures shown here assume a single hop relay.

1. If in coverage, the Remote UE and UE-to-Network Relay UE independently get the service authorization for indirect communication from the network.

2-3. The Remote UE and UE-to-Network Relay UE perform UE-to-Network Relay UE discovery and selection.

4. Remote UE initiates a one-to-one communication connection with the selected UE-to-Network Relay UE over PC5, by sending an indirect communication request message to the UE-to-Network Relay.

5. If the UE-to-Network Relay UE is in CM_IDLE state, triggered by the communication request received from the Remote UE, the UE-to-Network Relay UE sends a Service Request message over PC5 to its serving AMF.

The Relay's AMF may perform authentication of the UE-to-Network Relay UE based on NAS message validation and if needed the AMF will check the subscription data.

If the UE-to-Network Relay UE is already in CM_CONNECTED state and is authorised to perform Relay service then step 5 is omitted.

6. The UE-to-Network Relay UE sends the indirect communication response message to the Remote UE.

7. Remote UE sends a NAS message to the serving AMF. The NAS message is encapsulated in an RRC message that is sent over PC5 to the UE-to-Network Relay UE, and the UE-to-Network Relay UE forwards the message to the NG-RAN. The NG-RAN derives Remote UE's serving AMF and forwards the NAS message to this AMF.

NOTE: It is assumed that the Remote UE's PLMN is accessible by the UE-to-Network Relay's PLMN and that UE-to-Network Relay UE AMF supports all S-NSSAIs the Remote UE may want to connect to.

If Remote UE has not performed the initial registration to the network in step 0, the NAS message is initial registration message. Otherwise, the NAS message is service request message.

If the Remote UE performs initial registration via the UE-to-Network relay, the Remote UE's serving AMF may perform authentication of the Remote UE based on NAS message validation and if needed the Remote UE's AMF checks the subscription data.

For service request case, User Plane connection for PDU Sessions can also be activated. The other steps follow the clause 4.2.3.2 in 3GPP TS 23.502.

8. Remote UE may trigger the PDU Session Establishment procedure as defined in clause 4.3.2.2 of 3GPP TS 23.502.

9. The data is transmitted between Remote UE and UPF via UE-to-Network Relay UE and NG-RAN. The UE-to-Network Relay UE forwards all the data messages between the Remote UE and NG-RAN using RAN specified L2 relay method.

Radio Link Failure in Sidelink

The UE shall:

1> upon indication from sidelink RLC entity that the maximum number of retransmissions for a specific destination has been reached; or 1> upon T400 expiry; or 1> upon indication from sidelink MAC entity that the maximum number of consecutive HARQ DTX for a specific destination has been reached; or 1> upon integrity check failure indication from sidelink PDCP entity concerning SL-SRB2 or SL-SRB3:

2> consider sidelink radio link failure to be detected for this destination;

2> release the DRBs of this destination, in according to sub-clause 5.8.9.1a.1;

2> release the SRBs of this destination, in according to sub-clause 5.8.9.1a.3;

2> discard the NR sidelink communication related configuration of this destination;

2> reset the sidelink specific MAC of this destination;

2> consider the PC5-RRC connection is released for the destination;

2> indicate the release of the PC5-RRC connection to the upper layers for this destination (i.e. PC5 is unavailable);

2> if UE is in RRC_CONNECTED:

3> perform the sidelink UE information for NR sidelink communication procedure, as specified in 5.8.3.3 or sub-clause 5.10.X in 3GPP TS 36.331;

NOTE: It is up to UE implementation on whether and how to indicate to upper layers to maintain the keep-alive procedure.

SUMMARY

An object of embodiments herein is to improve the performance in a wireless communications network using indirect link based relay.

According to an aspect of embodiments herein, the object is achieved by a method performed by a remote User Equipment, UE, for handling a path switch failure of a connection in a wireless communications network.

The remote UE detects the path switch failure. The path switch failure relates to a failure to switch path from: A first path to a first network node, to a second path to a second network node. At least one path out of the first path and the second path, comprises an indirect link.

Upon detecting the path switch failure, the remote UE continues to apply a previous configuration for the connection that was used before the path switch was triggered.

During continuing to apply the previous configuration, to recover from the path switch failure, the remote UE triggers a recovery procedure to continue the transmission. During the recovery procedure, the connection for the first path is kept.

According to another aspect of embodiments herein, the object is achieved by a remote User Equipment, UE, configured to handle a path switch failure of a connection in a wireless communications network. The remote UE is further configured to:

Detect the path switch failure, which path switch failure is adapted to relate to a failure to switch path from: a first path to a first network node, to a second path to a second network node, wherein at least one path out of the first path and the second path, is adapted to comprise an indirect link, upon detecting the path switch failure, continue to apply a previous configuration for the connection that was used before the path switch was triggered, and during continuing to apply the previous configuration, to recover from the path switch failure, trigger a recovery procedure adapted to continue the transmission, during which recovery procedure, the connection for the first path is kept.

Embodiments herein target to handle UE actions when a path switch procedure fails. Upon declaration of path switch failure, the remote UE tries to revert back to its previous configuration, before the triggering of the path switch. This is required in order to perform some recovery procedure and avoid releasing the entire relay path.

Embodiments herein brings the advantage of an efficient mechanism improve the performance in the wireless communications network. This is achieved by applying a previous configuration while triggering a recovery procedure to recover a from the path switch failure. This leads to a lower the connectivity interruption delay and reduce the signaling overhead, and results in an improved the performance in the wireless communications network.

BRIEF DESCRIPTION OF THE DRAWINGS

Examples of embodiments herein are described in more detail with reference to attached drawings in which:

FIG. 9 is a flowchart depicting embodiments of a method in a proxy node.

DETAILED DESCRIPTION

Figure 1:
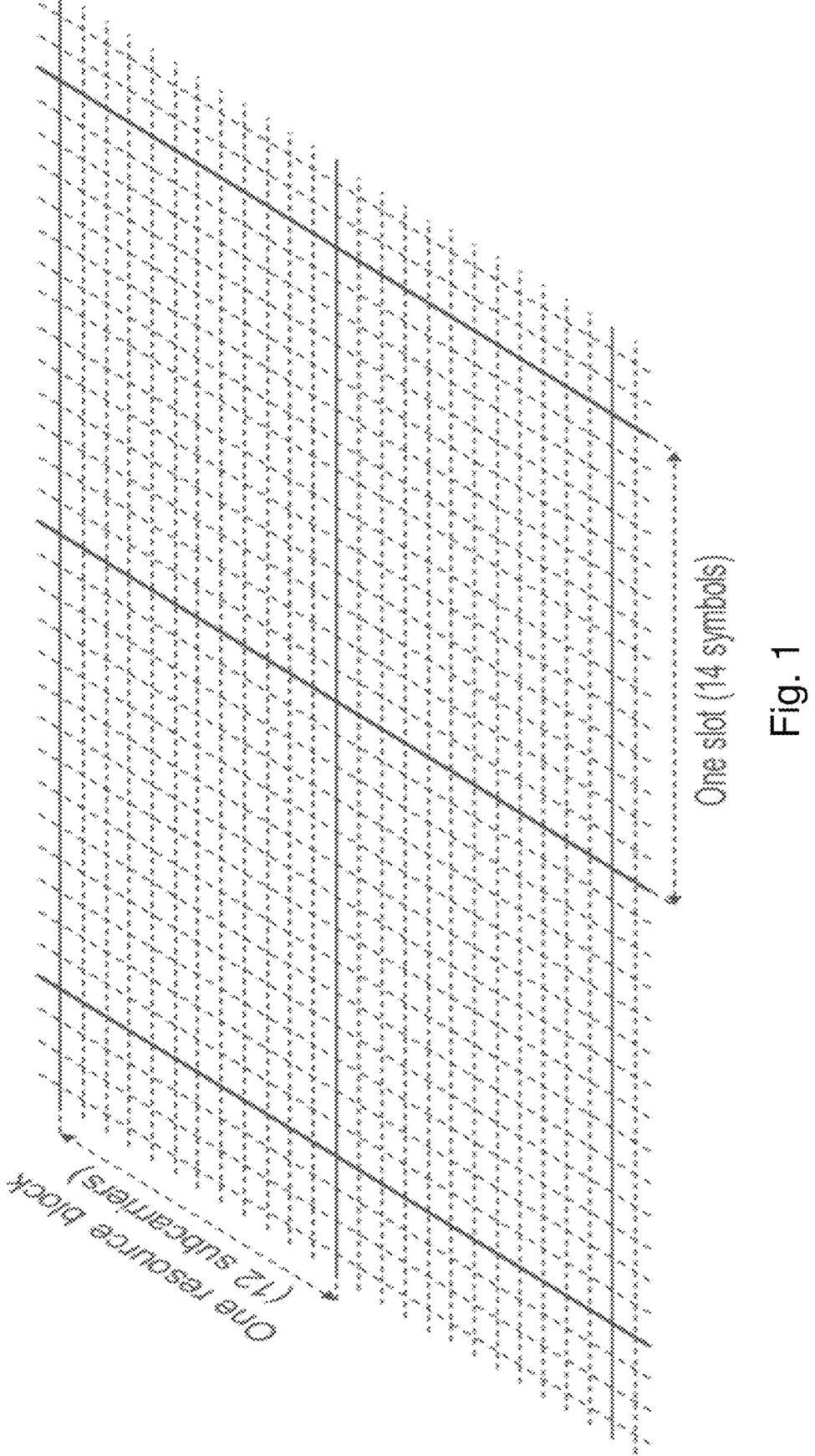
FIG. 1 illustrates an example of a physical resource grid according to prior art.
Figure 2:
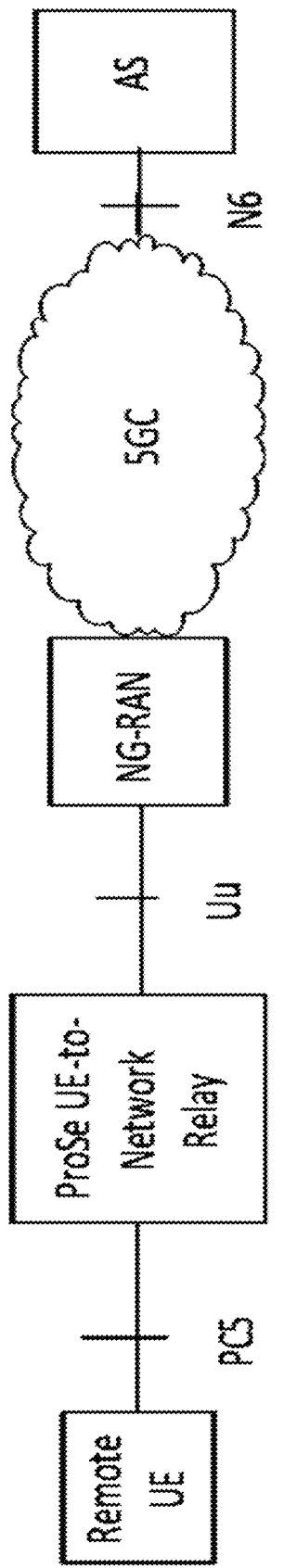
FIG. 2 is a schematic block diagram illustrating an example according to prior art.
Figure 3:
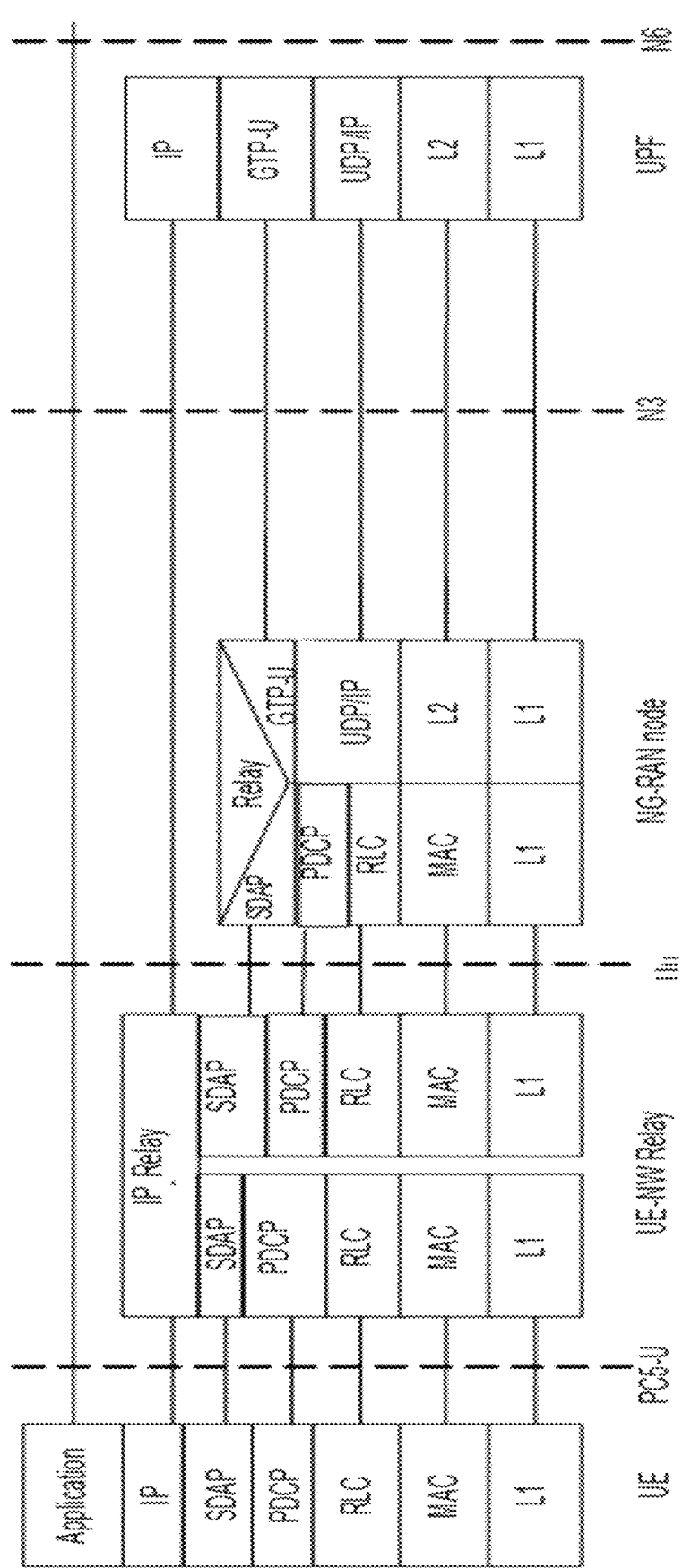
FIG. 3 is a schematic block diagram illustrating an example according to prior art.
Figure 4:
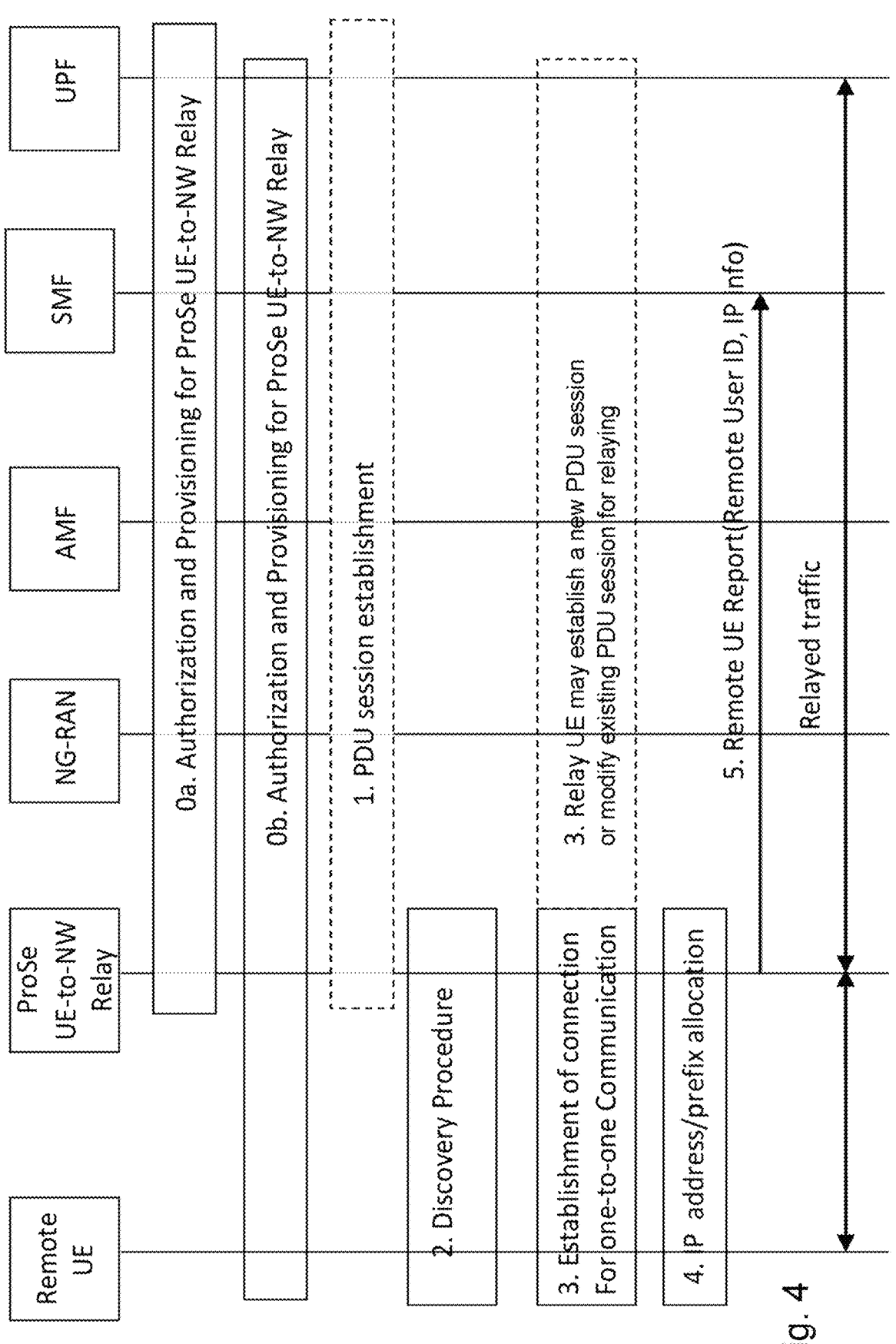
FIG. 4 is a signaling diagram illustrating an example according to prior art.
Figure 5:
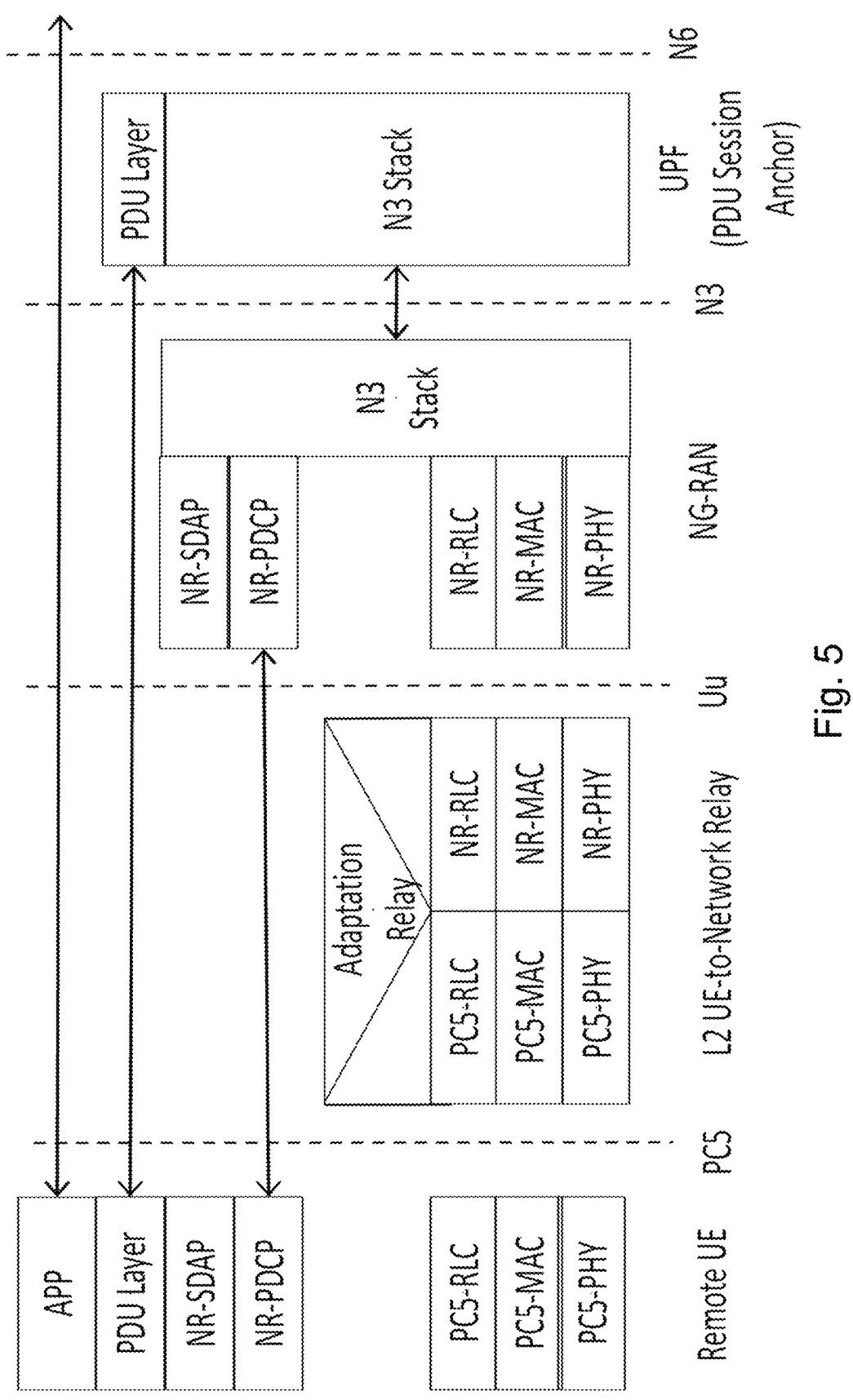
FIG. 5 is a schematic block diagram illustrating an example according to prior art.
Figure 6:
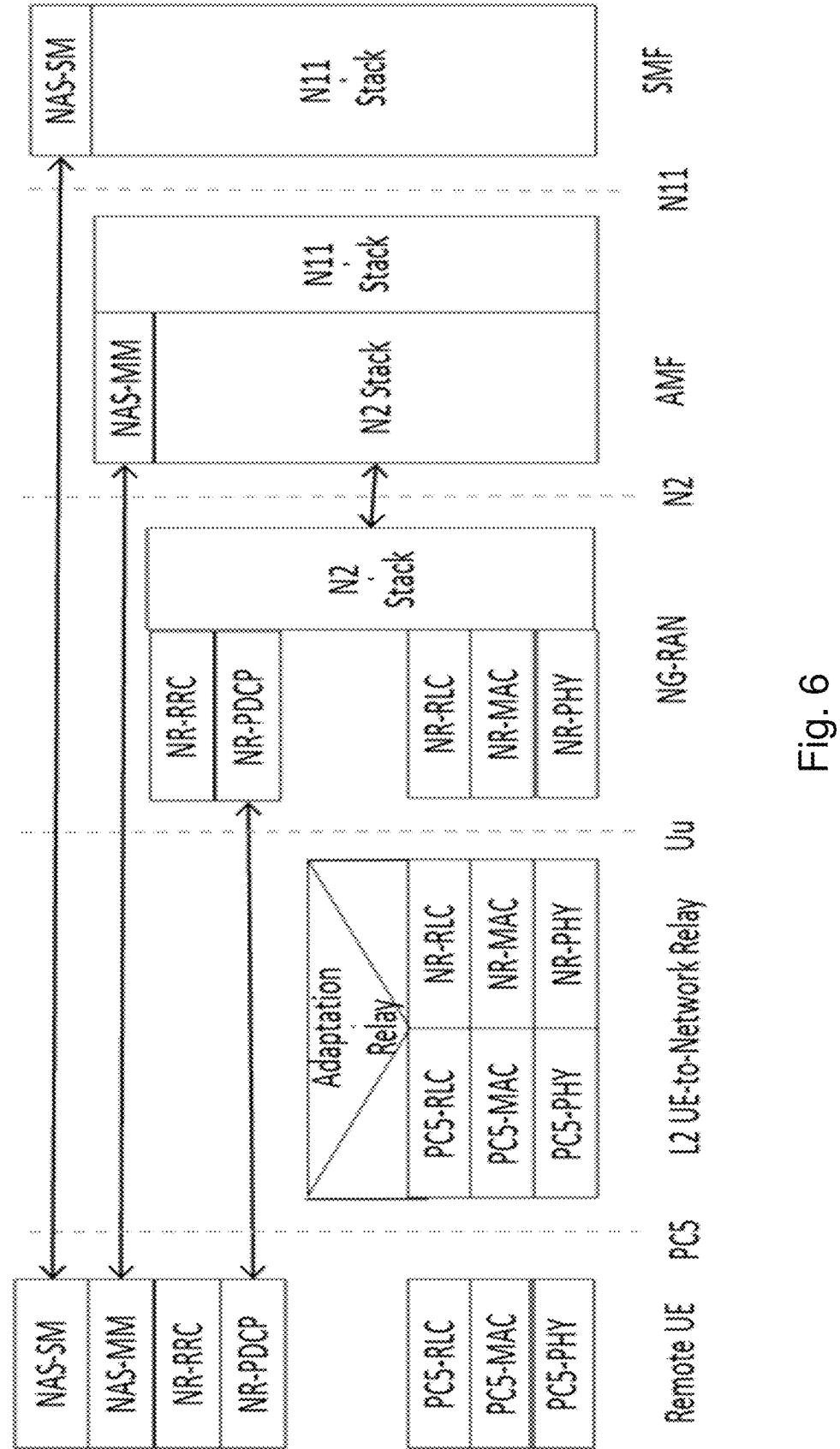
FIG. 6 is a schematic block diagram illustrating an example according to prior art.
Figure 7:
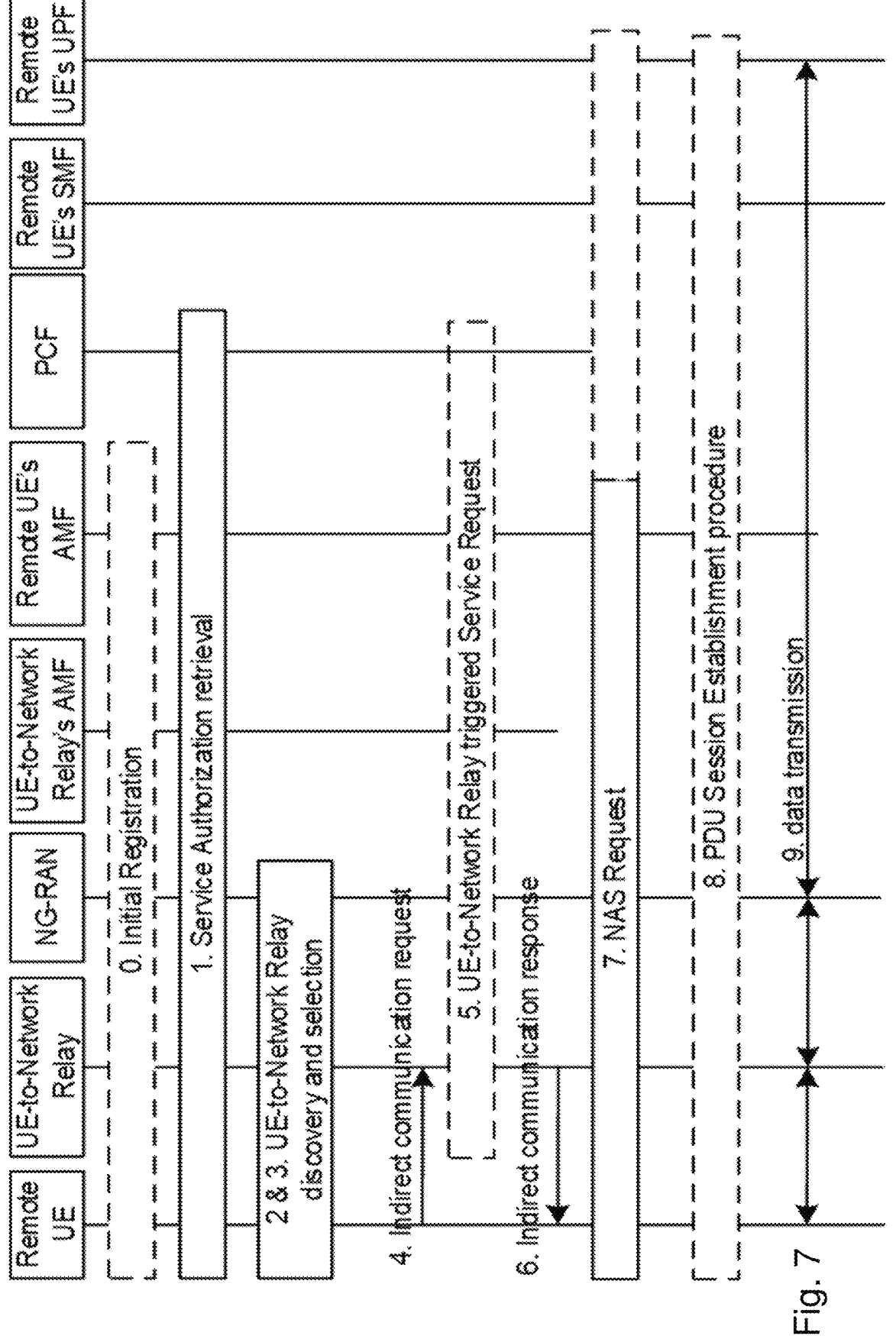
FIG. 7 is a signaling diagram illustrating an example according to prior art.

As a part of developing embodiments herein the inventors identified a problem which first will be discussed.

In the 3GPP Rel-17 SI on NR sidelink relay that just started in RAN2, the below objectives will be studied during 3GPP Rel-17 time frame.

This study item targets to study single-hop NR sidelink-based relay.

1. Study mechanisms with minimum specification impact to support the SA requirements for sidelink-based UE-to-network and UE-to-UE relay, focusing on the following aspects, if applicable, for layer-3 relay and layer-2 relay;

A. Relay (re-)selection criterion and procedure;

B. Relay/Remote UE authorization;

C. QoS for relaying functionality;

D. Service continuity;

E. Security of relayed connection after SA3 has provided its conclusions;

F. Impact on user plane protocol stack and control plane procedure, e.g. connection management of relayed connection;

2. Study mechanisms to support upper layer operations of discovery model/procedure for sidelink relaying, assuming no new physical layer channel/signal;

NOTE 1: The study shall take into account of further input from 3GPP SA WGs, e.g. SA2 and SA3, for the bullets above, if applicable.

NOTE 2: It is assumed that UE-to-network relay and UE-to-UE relay use the same relaying solution.

NOTE 3: Forward compatibility for multi-hop relay support in a future release needs to be taken into account.

In order to guarantee service continuity, how to handle the RLF in sidelink relay scenarios is an important part that needs yet to be studied and specified.

Since in a relay path more than two entities are involved, i.e. the remote UE, the relay UE, and the gNB, also referred to as network node herein, or the destination remote UE, is not clear how each of them performs radio link monitoring (RLM) and what are the actions to be performed once that radio link failure (RLF) has been detected.

An object of embodiments herein is to improve the performance in a wireless communications network using indirect link based relay.

Some of the embodiments provided herein target to handle UE actions when a path switch procedure from an indirect to a direct (or vice versa) link fails. In such a case, a remote UE will first try to restore the connectivity and, if not possible, perform discovery with cell (re)selection in order to setup a new relay path with a new relay UE. It should be noted that in some embodiments, the indirect link is referred to as side-links.

In particular, upon declaration of path switch failure, the remote UE tries to revert back to its previous configuration, before the triggering of the path switch. This is required in order to perform some recovery procedure and avoid releasing the entire relay path. According to this, once the remote UE is able to revert back to its previous configuration, one or more of the following options may be performed:

Option 1. The remote UE triggers the Uu RRC reestablishment procedure and try to reestablish a direct RRC connection with a (new) gNB.

Option 2. The remote UE triggers the discovery and cell (re)selection procedure in order to (re)select a (new) relay UE.

Option 3. The remote UE triggers a RRC reestablishment procedure but when performing the cell (re)selection the UE search for a candidate gNB and a relay UE.

Option 4. The remote UE releases the relay path and goes to RRC_IDLE.

Embodiments herein target to handle UE actions when the path switch procedure from an indirect to a direct (or vice versa) link fails. These actions have the main target to lower the connectivity interruption delay and reduce the signaling overhead. It is an advantage that this it is still valid irrespective of whether a Layer 3 (L3)- or a Layer 2 (L2)-based relay method is used.

Figure 8:
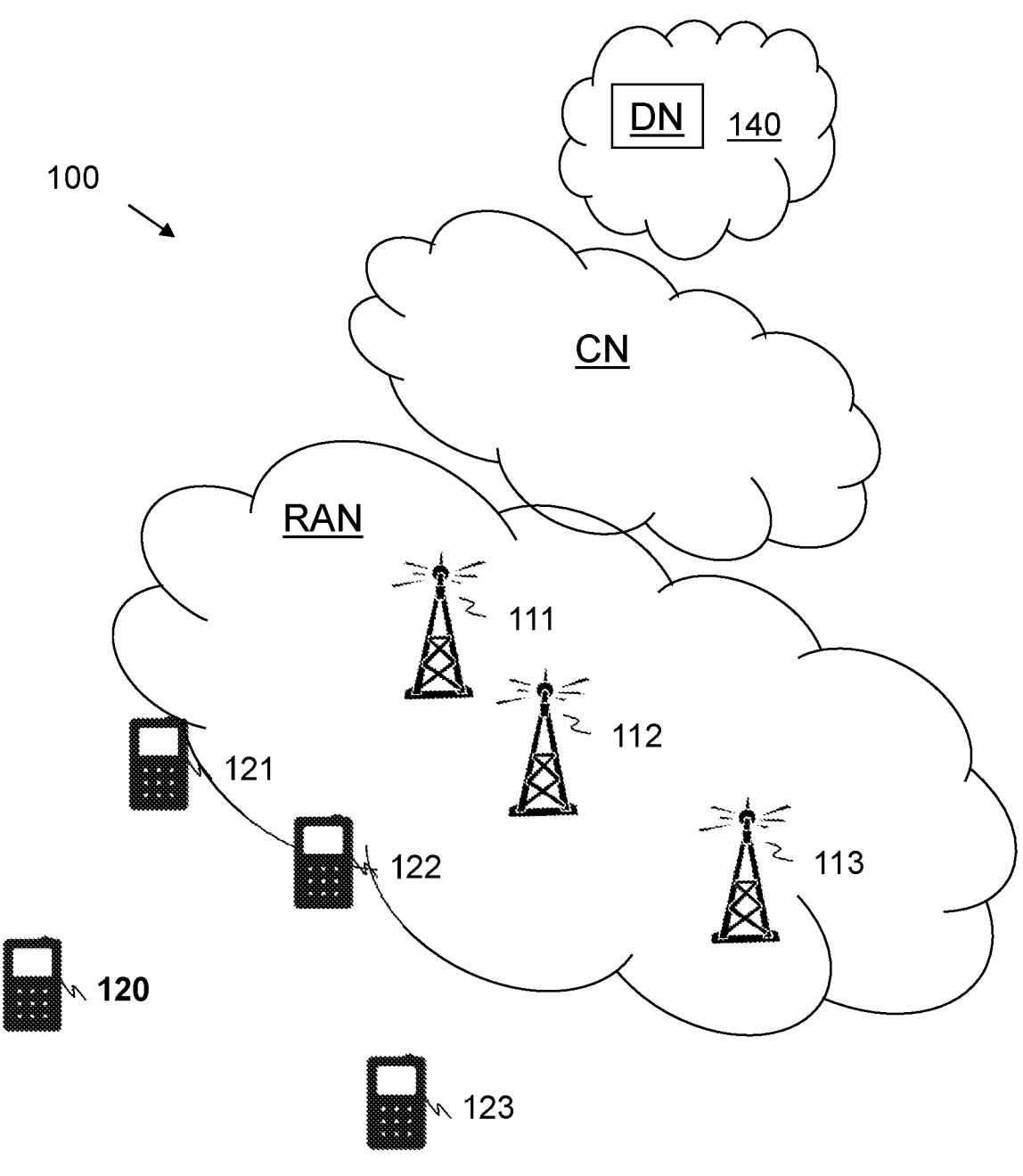
FIG. 8 is a schematic block diagram illustrating embodiments of a wireless communications network.

FIG. 8 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Wi-Fi, (LTE), LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Network nodes such as a first network node 111, a second network node 112, and a third network node 113, operate in the wireless communications network 100. The RAN node 110 e.g. provides a number of cells and may use these cells for communicating with e.g. a UE 120 located in the cell. Each of the first, second and third network nodes 111, 112 and 113 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within any of cell1 and cell2 served by the RAN node 110 depending e.g. on the radio access technology and terminology used.

In some example scenarios according to embodiments herein, the first network node 111 is involved in a first path of a connection before a switching path, the second network node 112 is involved in a second path of the connection when trying but failing to switch path, and the third network node 113 is involved in a third path of the connection in recovery procedure to continue the transmission.

It should be noted that any of the first, second and third network nodes 111, 112, and 113 may be the same network node.

User Equipments operate in the wireless communications network 100, such as a remote UE 120, a first relay UE 121, a second relay UE 122 and a third relay UE 123.

The remote UE 120, and the first, second and third relay UEs 121, 122, 123, may each e.g. be a mobile station, a non-Access Point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) device, an Machine to Machine (M2M) device, or node e.g. smart phone, laptop, mobile phone, sensor, relay, mobile tablets or even a small base station communicating within a cell.

Some embodiments herein are performed in the remote UE 120. A remote UE means a UE that connects to another destination node (e.g., gNB or UE) via a relay UE.

The first, second and third relay UEs 121, 122, 123 are relay UEs. A relay UE means a UE that provides the relay function to another UE.

In some example scenarios according to embodiments herein, the first relay UE 121 is involved in a first path of a connection before a switching path, the second relay UE 122 is involved in a second path of the connection when trying but failing to switch path, and the third relay UE 123 is involved in a third path of the connection in recovery procedure to continue the transmission. It should be noted that any of the first, second and third relay UEs 121, 122, 123 may be the same relay UE.

Methods herein may in one aspect be performed by the remote UE 120. As an alternative, a Distributed Node (DN) and functionality, e.g. comprised in a cloud 140 as shown in FIG. 8, may be used for performing or partly performing the methods.

As hinted above, embodiments provided herein target to handle UE actions taken by the remote UE 120 when the path switch procedure from an indirect to a direct (or vice versa) link fails. In an example of such a case, the remote UE 120 will first try to restore the connectivity and, if not possible, perform discovery with cell (re)selection in order to setup a new relay path with a new relay UE such as e.g. the third relay UE 123.

In particular, upon declaration of path switch failure, the remote UE 120 may try to revert back to its previous configuration (before the triggering of the path switch). This is performed in order to perform some recovery procedure and avoid releasing the entire relay path. According to this, once the remote UE 120 is able to revert back to its previous configuration, one or more of the following options may be performed:

Option 1. The remote UE 120 triggers a Uu RRC reestablishment procedure and tries to reestablish a direct RRC connection with a (new) gNB such as the third network node 113. In doing this, the UE (re)selecting the existing such as e.g. the second network node 112 or a new gNB such as e.g. third network node 113, on which to perform RACH. If this fails and no other gNBs are selected, than the remote UE 120 may autonomously go to IDLE mode and try to restore the RRC connection again, in a later point of time.

Option 2. The remote UE 120 triggers the discovery and cell (re)selection procedure in order to (re)select a (new) relay UE such as the third relay UE 123. When the discovery procedure is initiated, the remote UE 120 will select a new relay UE such as the third relay UE 123 in order to restore the relay path and continue the normal relay transmission and reception operations. Finally, if the discovery procedure fails, in this case the Uu reestablishment procedure may be triggered by the remote UE 120, e.g. as described in Option 1.

Option 3. The remote UE 120 may trigger an RRC reestablishment procedure but when performing the cell (re)selection the remote UE 120 searches for a candidate gNB such as the third network node 113 and a relay UE such as the third relay UE 123 (i.e., via the discovery procedure. According to this, the remote UE 120 may select a candidate with the strongest channel condition and try to restore the relay path (or the direct path in case it selects a gNB such as the third network node 113. In this case, if the restoring of the relay path fails over the candidate node selected (gNB or UE), the remote UE 120 may try again to restore the relay path towards the other node, e.g. that previously was down selected, i.e. not selected.

FIG. 9 shows an example method performed by the remote UE 120, e.g. for handling a path switch failure of a connection in a wireless communications network 100.

According to an example scenario of embodiments herein, handling a path switch failure may relate to a path switch from a first path with an ongoing transmission, to a second path and to trigger a recovery procedure to set up a third path to keep the remote UE 120 in RRC CONNECTED. In other words, the remote UE 120 may keep itself in RRC CONNECTED if the path switch failure can be recovered so as to avoid creating interruption to the data transmissions due to the path switch failure. According to embodiments herein, the time that the transmission is stopped is short, shorter than methods provided in prior art. This is since otherwise, the remote UE 120 tears down its current connection upon detection of the path switch failure and goes to RRC IDLE, and establishes a new connection, which will cause longer interruption to the data transmission. Any two of the three network nodes the first network node 111, the second network node 112 and the third network node 113 may be the same node. All three nodes 111, 112, 113 may be the same node.

The method comprises any one or more out of the actions below, which may be taken in any suitable order:

Action 901

The remote UE 120 detects the path switch failure. The path switch failure relates to a failure to switch path from: A first path to the first network node 111, to a second path to a second network node 112. This may mean to switch path from a first path towards the first network node 111, to a second path towards the second network node 112. At least one path out of the first path and the second path comprises an indirect link. The indirect link may e.g. be an indirect connection between a remote UE 120 and target node such as the network node 111, 112, 113, via an intermediate node also known as relay UE 121, 122, 123. In the indirect link, a relay UE such as the first, or second relay UEs 121, 122 relays the path towards the first or second network node 111, 112.

The path switch failure may relate to a failure to switch path according to any one out of: From a direct link to an indirect link, from an indirect link to a direct link, or from an indirect link to another indirect link.

In some embodiments, when relating to the first path, any one or more out of: The direct link relates to a direct path between the remote UE 120 and the first network node 111, and the indirect link relates to a path between the remote UE 120 and the first network node 111, via a first relay UE 121.

In some embodiments, when related to the second path, any one or more out of: The direct link relates to a direct path between the remote UE 120 the second network node 112, and the indirect link relates to a path between the remote UE 120 the second network node 112, via a second relay UE 122.

Action 902

Upon detecting the path switch failure, the remote UE 120 continues to apply a previous configuration for the connection that was used before the path switch was triggered. A new configuration may have been signaled to the remote UE 120, but instead of applying the new configuration, the remote UE 120 continues to apply the previous configuration. In this way, the remote UE 120 can keep itself in RRC CONNECTED instead of tearing down its RRC connection immediately upon detection of the path switch failure.

Action 903

During continuing to apply the previous configuration, remote UE 120 to recover from the path switch failure, e.g. try to recover from the path switch failure. This is performed by triggering a recovery procedure to continue the transmission. A recovery procedure when used herein e.g. means that the UE keeps itself in RRC CONNECTED by performing a procedure to recover from the failure.

During the recovery procedure, the connection for the first path is kept. This is an advantage since otherwise the remote UE tears down its current connection upon detection of the path switch failure and goes to RRC IDLE, and establishes a new connection, which will cause longer interruption to the data transmission.

The recovery procedure to continue the transmission e.g. means that when the recovery procedure is successful, this enables the transmission to be continued. Or e.g. means that after the recovery procedure has become successful, the transmission can be continued.

In some embodiments, triggering the recovery procedure to continue the transmission comprises any one or more out of the of the following options 1-3:

Option 1 comprises triggering a procedure to establish a direct link with a third network node 113 to continue the transmission. This may comprise to trigger a procedure to establish an option 1 path comprising a direct link with a third network node 113 to continue the transmission. The third network node 113 may be the first or second network node 111, 112. The remote UE 120 e.g. triggers a Uu RRC reestablishment procedure and tries to reestablish a direct link such as a direct RRC connection with a new gNB such as e.g. the third network node 113. By performing this, the remote UE 120 selects or reselects the existing or a new gNB on which to perform RACH. If this fails and no other gNBs are selected, then the remote UE 120 may autonomously go to IDLE and try to restore again the RRC connection in a later point of time.

Option 2 comprises triggering a procedure to establish an indirect link with the second network node 112 via a third relay UE 123 to continue the transmission. This may comprise to trigger a procedure to establish an option 2 path comprising an indirect-link with the second network node 112 via a third relay UE 123 to continue the transmission.

The remote UE 120 may trigger the procedure to establish the option 2 path comprising the indirect link by triggering a discovery and cell (re)selection procedure in order to select a new relay UE such as the third relay UE 123. When the discovery procedure is initiated, the remote UE 120 may select a new relay UE in order to restore the relay path and continue the normal relay transmission and reception operations. Finally, if the discovery procedure fails, in this case a Uu establishment procedure is triggered by the remote UE 120 as described in Option 1.

Option 3 comprises triggering a procedure to establish an indirect-link with a third network node 113 via a third relay UE 123 to continue the transmission. This may comprise to triggering a procedure to establish an option 3 path comprising an indirect-link with a third network node 113 via a third relay UE 123 to continue the transmission.

The remote UE 120 e.g. triggers an RRC establishment, for both Uu and PC5, procedure but when performing a cell selection re-selection, the remote UE 120 searches for a candidate gNB such as the third network node 113, and a third relay UE 123, e.g., via a discovery procedure. According to this, the remote UE 120 may preferably select the candidate with the strongest channel condition try to restore the relay path or the direct path in case the remote UE 120 selects a gNB. In this case, if the restoring of the relay path will fail over the candidate node selected, gNB or UE, the remote UE 120 may try again to restore the relay path towards the other node that previously was down selected.

Action 904

The remote UE 120 may then send to any one or more out of: the first network node 111, the second network node 112 and the third network node 113, a report message including failure related information for SON/MDT purposes.

Action 905

In some embodiments, when the recovery procedure to continue the transmission fails, the remote UE 120 may enter into idle mode.

The method will now be further explained and exemplified in below embodiments. These below embodiments may be combined with any suitable embodiment as described above.

The embodiments are described in the context of NR, i.e., remote UE 120 and relay UEs 121, 122, 123 are deployed in a same or different NR cell. The embodiments may also apply to other relay scenarios including UE to network relay or UE to UE relay where the link between remote UE 120 and first, second and third relay UEs 121, 122, 123 may be based on LTE side-link or NR side-link, a Uu connection between any of first, second and third relay UEs 121, 122, 123 and respective first, second and third network nodes 111, 112 and 113 may be LTE Uu or NR Uu. A relay scenario comprising multiple relay hops is also covered. The connection between the remote UE 120 and respective first, second and third relay UEs 121, 122, 123 is also not limited to side-link. Any short-range communication technology such as Wifi is equally applicable. In the below embodiments, any grant issued by the respective the first, second and third network nodes 111, 112 and 113 is for a side-link transmission between two UEs such as between the remote UE 120 and respective first, second and third relay UEs 121, 122, 123.

The embodiments may also apply to a relay scenario where the remote UE 120 is configured with multiple connections, i.e., the number of connections is equal or larger than two, to the RAN, e.g., dual connectivity, carrier aggregation etc.

The embodiments may apply to both L2 relay and L3 relay-based relay scenarios.

Further, the term "direct path" is used to stand for a direct connection from the remote UE 120 to a gNB such as the respective first, second and third network nodes 111, 112 and 113 or a UE. The term "indirect path" is used to stand for an indirect connection between the remote UE 120 and a gNB such as the respective first, second and third network nodes 111, 112 and 113, or another destination UE via an intermediate node also known as relay UE or relay gNB.

In the following embodiments are described, considering that the destination node is a gNB such as the respective first, second and third network nodes 111, 112 and 113, but the same embodiments may also be applied to cases where the destination node is another UE.

Figure 10:
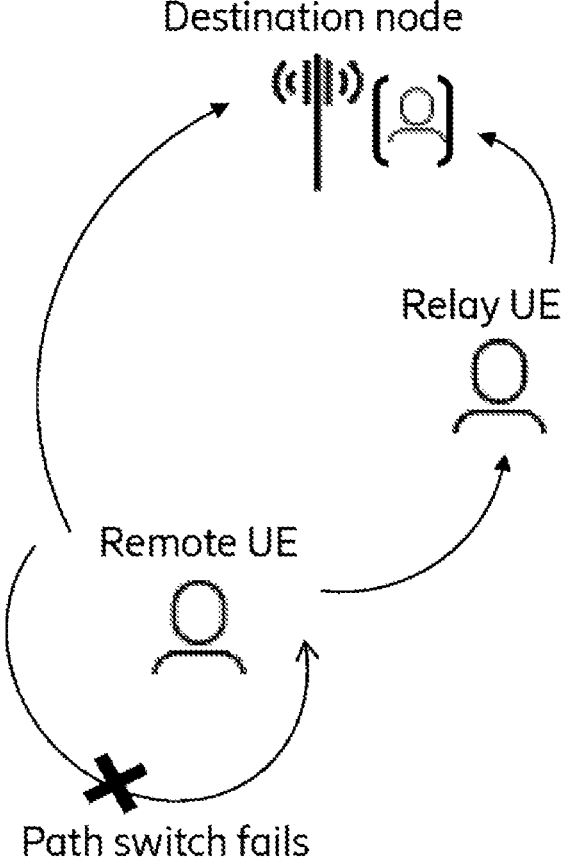
FIG. 10 is a schematic block diagram depicting examples of embodiments herein.

FIG. 10 depicts a path switch failure when switching, e.g. trying to switch, from the first path being a direct path to the second path being an indirect path.

Figure 11:
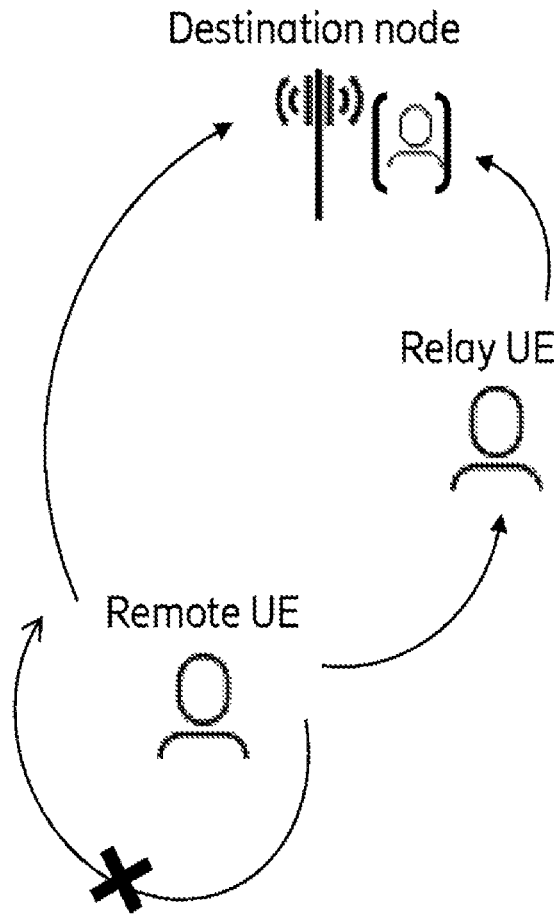
FIG. 11 is a schematic block diagram depicting examples of embodiments herein.

FIG. 11 depicts a path switch failure when switching, e.g. trying to switch, from the first path being an indirect path to the second path being a direct path.

An assumption may be that both the remote UE 120 and the relay UE such as respective first, second and third relay UE 121, 122, 123, performs radio link monitoring (RLM) on the first and second link of the relay path. Of course, the remote UE 120 may do RLM on the first link while the respective first, second and third relay UE 121, 122, 123 may perform RLM on the first and second relay path. Further, if a direct link is available between the remote UE 120 and the destination node such as respective the first, second and third network node 111, 112 and 113, the remote UE 120 may perform also RLM on this direct link.

The assumption made for the following embodiments may be that there is a remote UE, the remote UE 120, that triggers the path switch procedure in order to change its serving link from a direct to an indirect path or vice versa. The path switch procedure may be triggered directly by the gNB, such as respective the first, second and third network node 111, 112 and 113, e.g. upon the reception of a measurement report from the remote UE 120 or respective first, second and third relay UEs 121, 122, 123, or by the remote UE 120 itself. If it is the remote UE 120 itself that triggers the path switch procedure, it may be e.g., due poor channel conditions over PC5 or because the relay UE is not available anymore.

Examples of Some Embodiments

In these examples, the respective the first, second and third network node 111, 112 and 113 are referred to as the gNB 111, 112, 113 and the respective first, second and third relay UEs 121, 122, 123 are referred to as the relay UE 121, 122, 123.

In example #1, during the path switch procedure, the procedure fails if e.g. one or more of the following conditions are met:

1. A timer in the remote UE 120 expires after triggering the path switch procedure.

When the remote UE 120 starts the path switch procedure, a timer is started when the remote UE 120 starts to access a target node i.e., either a gNB 111, 112, 113 or a relay UE 121, 122, 123. If the access is not completed by the expiration of such timer the path switch procedure is considered as failed.

The target node can be either signaled by a gNB in case the remote UE 120 has connection to the gNB 111, 112, 113, via direct connection or indirect connection, or selected by the remote UE 120 in case the remote UE 120 has connection to the gNB 111, 112, 113.

The timer may be stopped if the remote UE 120 has completed the access to the target node. If the target node is a gNB, the UE may stop the timer after a RACH procedure is completed. If the target node is a UE, the UE may stop the timer after the UE has received confirmation or complete message for the signaling message that the UE sent for link and/or connection establishment.

2. The path switch procedure is rejected by the target gNB/UE.

It may happen that the remote UE 120 triggers the path switch procedure towards the gNB 111, 112, 113, if it is from indirect to direct path, or another UE 121, 122, 123, if it is from direct to indirect path, but the target gNB/UE does not have enough resources to accommodate the remote UE 120. In such a case, the path switch procedure by the remote UE 120 may be rejected by the target gNB 111, 112, 113/relay UE 121, 122, 123.

3. The remote UE 120 may not be able to decode the new configuration received from the target gNB 111, 112, 113/relay UE 121, 122, 123.

When performing the path switch procedure, the remote UE 120 gets a new configuration to be applied by the target gNB 111, 112, 113/relay UE 121, 122, 123. However, it may happen that the remote UE 120 is not able to comply with the new configuration due to limited capability or erroneous decoding of fields and IEs.

4. Upon an indication from the relay UE 121, 122, 123 that the Uu link, e.g. as of the path switch, has failed or is in bad conditions.

The relay UE 121, 122, 123 may perform RLM on the PC5 and Uu relay path and thus it may inform the remote UE 120 that the Uu/PC5 link of the relay path is getting bad or is failed. This means that the remote UE 120 may need to change the relay path, i.e., basically the relay UE, e.g. Relay UE 121, 122, 123, in order to reach again the gNB 111, 112, 113.

Any other event on the Uu link between the relay UE 121, 122, 123 and the gNB 111, 112, 113 which triggers RLF on Uu such as:

i. a maximum number of out of sync instances in DL has been reached ii. a maximum number of RLC retransmissions in UL has been reached iii. a maximum number of RACH transmission attempts in UL has been reached 5. Any other event on PC5 link between the remote UE 120 and the relay UE 121, 122, 123 which triggers RLF on the PC5 link such as:

a maximum number of out of sync instances on the link has been reached.

The remote UE 120 may monitor the PC5 radio channel quality based on a specific reference symbol. The remote UE 120 may then compare the measured channel quality with the out-of-sync and in-sync thresholds, Qout and Qin respectively. The physical channel evaluates the PC5 channel quality, periodically sends indication on out-of-sync or in-sync, to layer 3. The remote UE 120 layer 3 then evaluates if the radio link failure based on the in-sync and out-of-sync indications, that output from the layer 3 filter. For RLM on the PC5 link, a counter and/or a timer may be defined. In an example, when the consecutively received out-of-sync indications are beyond a configured counter, a timer is started. While the timer is running, the radio link considered to be recovered if the remote UE 120 consecutively receives a configured number of in-sync indications from the physical layer.

a maximum number of RLC retransmissions has been reached.

a configuration or reconfiguration error occurs upon reception of an RRC configuration/reconfiguration signaling message.

a maximum number of HARQ DTX has been reached.

In example #2, upon declaration of path switch failure, the remote UE 120 tries to revert back to its previous configuration, before the triggering of the path switch. This means that the remote UE continuously applies its previous configuration. This is necessary in order to perform some recovery procedure and avoid releasing the entire relay path. According to this, once the remote UE 120 is able to revert back to its previous configuration, one or more of the following options 1-3 as mentioned above may be performed.

In example #3, if not possible to restore the relay connectivity according to the options described in example #2, the remote UE 120 may autonomously go to idle mode such as e.g. RRC_IDLE, and try to restore an RRC or relay path connection from scratch in a later point in time.

In example #4, after recovery from a path switch failure, the remote UE 120 may send a report message comprising failure related information to a RAN node, e.g., the new serving gNB such as the third network node 113, and/or the old serving gNB such as first or second network node 111, 112, for SON/MDT purposes. The report message may further be sent to CN nodes, such as e.g. a new serving AMF and/or an old serving AMF, and some or all other gNBs that support the SON/MDT feature. The report message may be also forwarded to the old relay UE 111 to inform that the remote UE 120 has successfully performed a path switch, also referred to as the third path.

In the example #5, at least one of the below information may be carried or indicated by the report message:

Remote ID relating to the remote UE 120

Destination L2 ID relating to an ID which can identify the destination.

Old Relay ID relating to the relay second UE 122

Cell ID relating to an ID or index of the cell.

New Relay ID relating to the third relay UE 123.

Relay path ID relating to an ID identifying the relay path.

Failure cause/Indicators on what caused the failure of the path switch procedure.

In the example #6, which actions the remote UE 120 should perform, according to what is described in any of the above embodiment, is configured by the gNB 111, 112, 113 via dedicated Uu RRC signaling or SIBs or may also be pre-configured. Alternatively, which actions the remote UE 120 should perform may also be configured by the relay UE 121, 122, 123 via direct PC5 RRC signaling or side-link broadcast/groupcast.

Figure 12A:
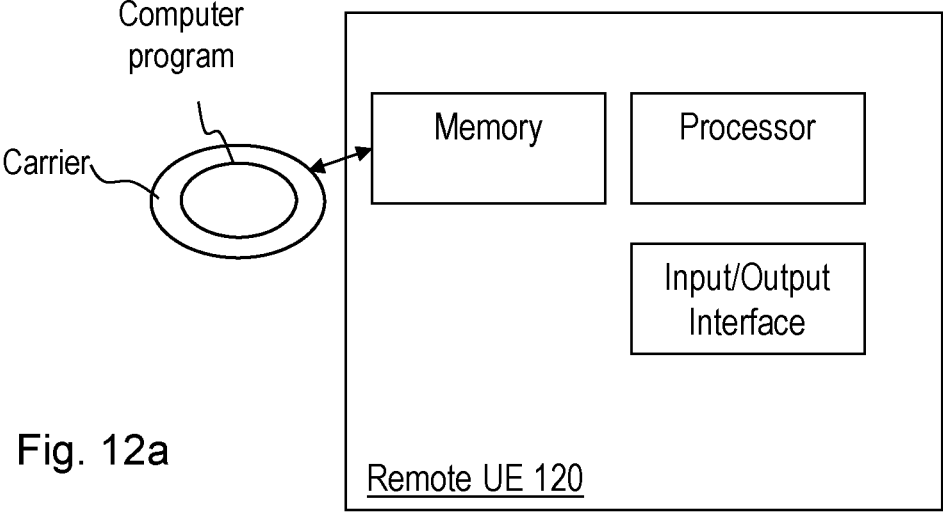
FIGS. 12 a and b are schematic block diagrams illustrating embodiments of a remote UE.
Figure 12B:
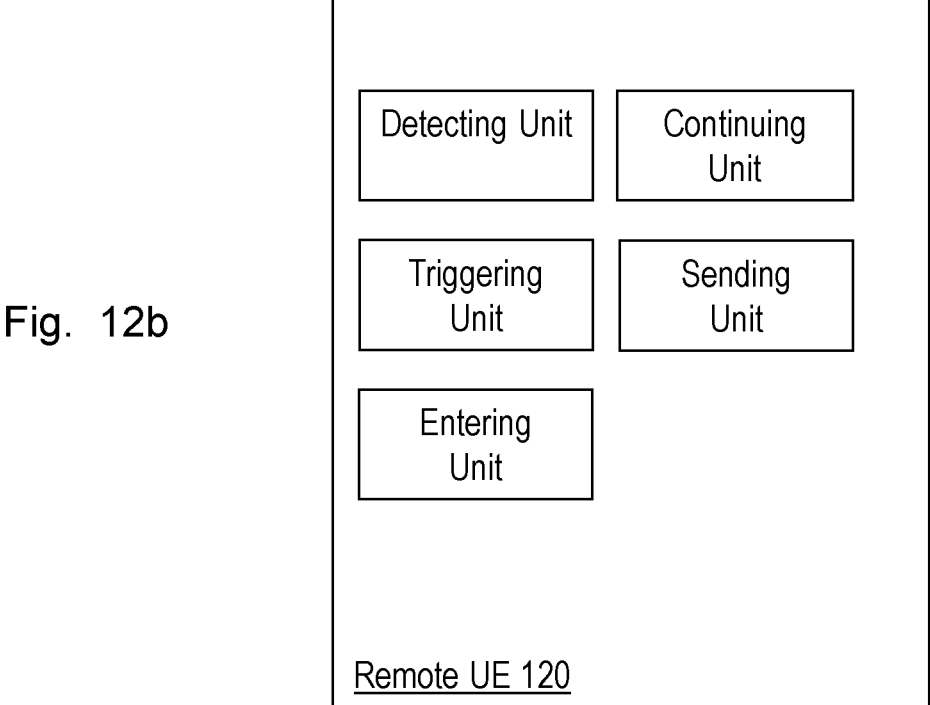

FIGS. 12*a* and 12*b* shows an example of arrangement in the remote UE 120.

The remote UE 120 may comprise an input and output interface configured to communicate with each other. The input and output interface may comprise a wireless receiver (not shown) and a wireless transmitter (not shown).

The remote UE 120 may comprise a detecting unit, a continuing unit, a triggering unit, a sending unit, and an entering unit to perform the method actions as described herein.

The embodiments herein may be implemented through a respective processor or one or more processors, such as the processor of a processing circuitry in the remote UE 120 depicted in FIG. 12*a*, together with computer program code for performing the functions and actions of the embodiments herein. The program code mentioned above may also be provided as a computer program product, for instance in the form of a data carrier carrying computer program code for performing the embodiments herein when being loaded into the remote UE 120. One such carrier may be in the form of a CD ROM disc. It is however feasible with other data carriers such as a memory stick. The computer program code may furthermore be provided as pure program code on a server and downloaded to the RAN node 110.

The remote UE 120 may further comprise respective a memory comprising one or more memory units. The memory comprises instructions executable by the processor in the RAN node 110.

The memory is arranged to be used to store instructions, data, procedures, options, paths, links, connections, configurations, and applications to perform the methods herein when being executed in the remote UE 120.

In some embodiments, a computer program comprises instructions, which when executed by the at least one processor, cause the at least one processor of the remote UE 120 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the remote UE 120, described below may refer to a combination of analog and digital circuits, and/or one or more processors configured with software and/or firmware, e.g. stored in the remote UE 120, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 13A:
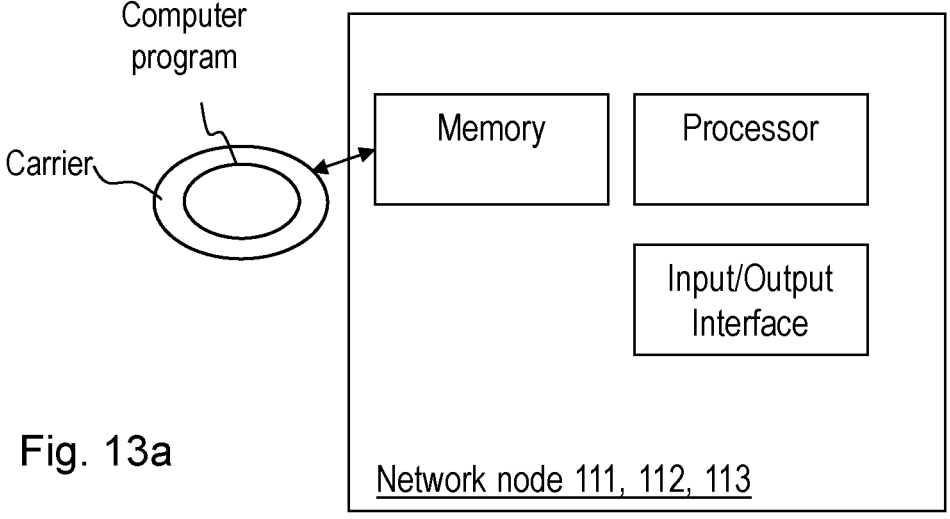
FIGS. 13 a and b are schematic block diagrams illustrating embodiments of a network node.
Figure 13B:
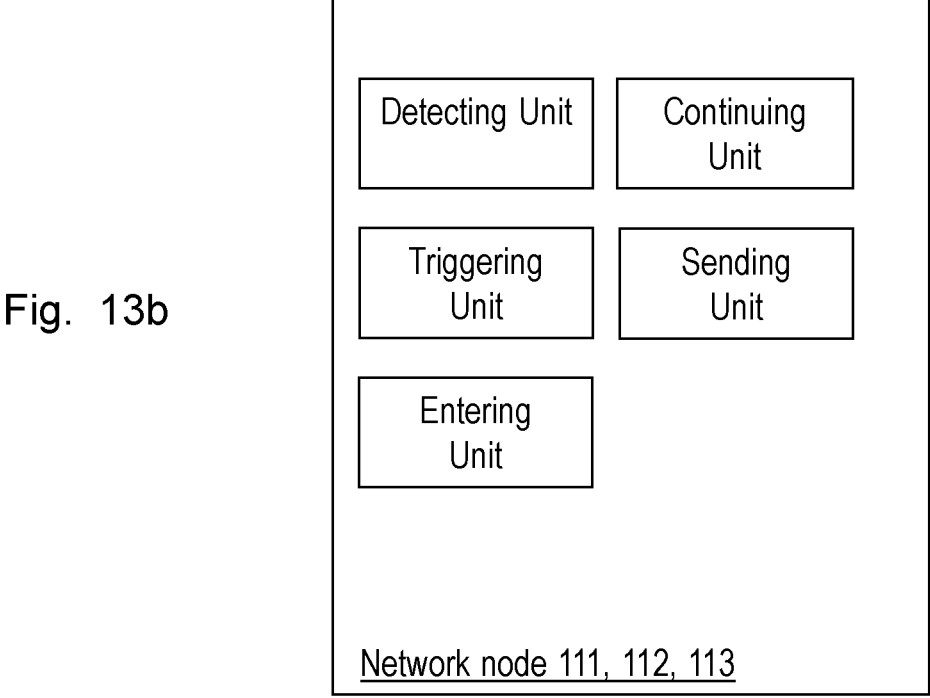

FIGS. 13*a* and 13*b* shows an example of arrangements in the network node 111, 112, 113.

The network node 111, 112, 113 may comprise an input and output interface configured to communicate with each other. The input and output interface may comprise a wireless receiver (not shown) and a wireless transmitter (not shown).

The network node 111, 112, 113 may comprise a detecting unit, a continuing unit, a triggering unit, a sending unit, and an entering unit to perform the method actions as described herein.

The embodiments herein may be implemented through a respective processor or one or more processors, such as the processor of a processing circuitry in the network node 111, 112, 113 depicted in FIG. 13*a*, together with respective computer program code for performing the functions and actions of the embodiments herein. The program code mentioned above may also be provided as a computer program product, for instance in the form of a data carrier carrying computer program code for performing the embodiments herein when being loaded into the network node 111, 112, 113. One such carrier may be in the form of a CD ROM disc. It is however feasible with other data carriers such as a memory stick. The computer program code may furthermore be provided as pure program code on a server and downloaded to the network node 111, 112, 113.

The network node 111, 112, 113 may further comprise respective a memory comprising one or more memory units. The memory comprises instructions executable by the processor in the network node 111, 112, 113.

The memory is arranged to be used to store instructions, data, procedures, options, paths, links, connections, configurations, and applications to perform the methods herein when being executed in the network node 111, 112, 113.

In some embodiments, a computer program comprises instructions, which when executed by the at least one processor, cause the at least one processor of the network node 111, 112, 113 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the network node 111, 112, 113, described below may refer to a combination of analog and digital circuits, and/or one or more processors configured with software and/or firmware, e.g. stored in the CN node 130, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some example embodiments 1-17 are shortly described. See e.g. FIGS. 8, 9, 12a, and 12b.

Embodiment 1. A method performed by a remote User Equipment, UE, 120 e.g. for handling a path switch failure of a connection in a wireless communications network 100, the method comprising any one or more out of:

detecting 901 the path switch failure, which path switch failure relates to a failure to switch path from: a first path to a first network node 111, to a second path to a second network node 112, wherein at least one path out of the first path and the second path, comprises an indirect link, upon detecting the path switch failure, continuing 902 to apply a previous configuration for the connection that was used before the path switch was triggered, and during continuing to apply the previous configuration, to recover from the path switch failure, triggering 903 a recovery procedure to continue the transmission, during which recovery procedure, the connection for the first path is kept.

Embodiment 2. The method according to embodiment 1, wherein the path switch failure relates to a failure to switch path according to any one out of:

from a direct link to an indirect-link, or from an indirect link to a direct link, or from an indirect link to another indirect link.

Embodiment 3. The method according to embodiment 2, when relating to the first path, any one or more out of:

the direct link relates to a direct path between the remote UE 120 and the first network node 111, and the indirect link relates to a path between the remote UE 120 and the first network node 111, via a first relay UE 121.

Embodiment 4. The method according to embodiment 2, when related to the second path, any one or more out of:

the direct link relates to a direct path between the remote UE 120 the second network node 112, and the indirect link relates to a path between the remote UE 120 the second network node 112, via a second relay UE 122.

Embodiment 5. The method according to embodiment 1, wherein triggering 903 the recovery procedure to continue the transmission comprises any one or more out of the of the following options 1-3:

option 1, comprising triggering a procedure to establish, e.g. an option 1 path comprising, a direct link with a third network node 113, to continue the transmission, which third network node 113 e.g. may be the first or second network node 111, option 2, comprising triggering a procedure to establish, e.g. an option 2 path comprising, an indirect-link with the second network node 112 via a third relay UE 123 to continue the transmission, option 3, comprising triggering a procedure to establish, e.g. an option 3 path comprising, an indirect-link with a third network node 113 via a third relay UE 123 to continue the transmission.

Embodiment 6. The method according to any of embodiments 1-5, further comprising:

sending 904 to any one or more out of: the first network node 111, the second network node 112 and the third network node 113, a report message including failure related information for SON/MDT purposes.

Embodiment 7. The method according to any of embodiments 1-6, further comprising any one or more out of:

when the recovery procedure to continue the transmission fails, entering 905 into idle mode, any two of the three network nodes "the first network node 111, the second network node 112 and the third network node 113" may be the same node, and wherein all three nodes 111, 112, 113 may be the same node.

Embodiment 8. A computer program comprising instructions, which when executed by a processor, causes the processor to perform actions according to any of the embodiments 1-7.

Embodiment 9. A carrier comprising the computer program of embodiment 8, wherein the carrier is one of an electronic signal, an optical signal, an electromagnetic signal, a magnetic signal, an electric signal, a radio signal, a microwave signal, or a computer-readable storage medium.

Embodiment 10. A remote User Equipment, UE, 120 e.g. configured to handle a path switch failure of a connection in a wireless communications network 100, wherein the remote UE 120 further is configured to any one or more out of:

detect, e.g. by means of a detecting unit in the remote UE 120, the path switch failure, which path switch failure is adapted to relate to a failure to switch path from: a first path to a first network node 111, to a second path to a second network node 112, wherein at least one path out of the first path and the second path, is adapted to comprise an indirect link, upon detecting the path switch failure, continue, e.g. by means of a continuing unit in the remote UE 120, to apply a previous configuration for the connection that was used before the path switch was triggered, and during continuing to apply the previous configuration, to recover from the path switch failure, trigger, e.g. by means of a triggering unit in the remote UE 120, a recovery procedure adapted to continue the transmission, during which recovery procedure, the connection for the first path is kept.

Embodiment 11. The remote UE 120 according to embodiment 10, wherein the path switch failure is adapted to relate to a failure to switch path according to any one out of:

from a direct link to an indirect-link, or from an indirect link to a direct link, or from an indirect link to another indirect link.

Embodiment 12. The remote UE 120 according to embodiment 11, when relating to the first path, any one or more out of:

the direct link is adapted to relate to a direct path between the remote UE 120 and the first network node 111, and the indirect link is adapted to relate to a path between the remote UE 120 and the first network node 111, via a first relay UE 121.

Embodiment 13. The remote UE 120 according to embodiment 11, when related to the second path, any one or more out of:

the direct link is adapted to relate to a direct path between the remote UE 120 the second network node 112, and the indirect link is adapted to relate to a path between the remote UE 120 the second network node 112, via a second relay UE 122.

Embodiment 14. The remote UE 120 according to embodiment 10, wherein the remote UE 120 is further configured to trigger the recovery procedure to continue the transmission by any one or more out of the of the following options 1-3:

option 1, adapted to comprise trigger a procedure to establish, e.g. an option 1 path comprising, a direct link with a third network node 113 may be the first or second network node 111 to continue the transmission.

option 2, adapted to comprise trigger a procedure to establish, e.g. an option 2 path comprising, an indirect-link with the second network node 112 via a third relay UE 123 to continue the transmission, option 3, adapted to comprise trigger a procedure, e.g. to establish an option 3 path comprising, an indirect-link with a third network node 113 via a third relay UE 123 to continue the transmission.

Embodiment 15. The remote UE 120 according to any of embodiments 10-14, further being configured to:

send, e.g. by means of a sending unit in the remote UE 120, to any one or more out of: the first network node 111, the second network node 112 and the third network node 113, a report message adapted to include failure related information for SON/MDT purposes.

Embodiment 16. The remote UE 120 according to any of embodiments 10-15, further being configured to:

when the recovery procedure to continue the transmission fails, enter, e.g. by means of an entering unit in the remote UE 120, into idle mode.

Embodiment 17. The remote UE 120 according to any of embodiments 10-15, wherein any one or more out of:

any two of the three network nodes "the first network node 111, the second network node 112 and the third network node 113" may be the same node, and wherein all three nodes 111, 112, 113 may be the same node.

Further Extensions and Variations

Figure 14:
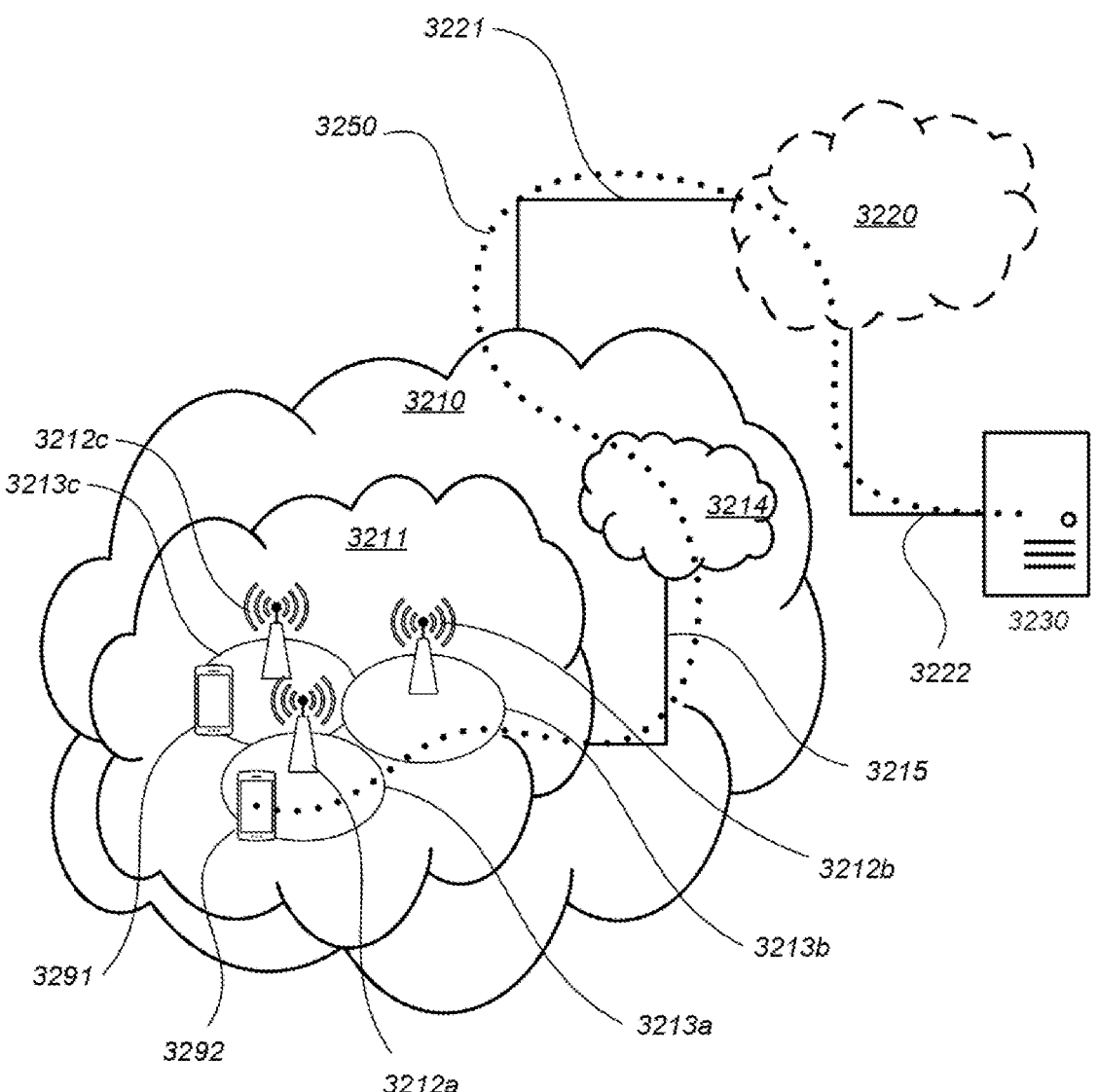
FIG. 14 schematically illustrates a telecommunication network connected via an intermediate network to a host computer.

With reference to FIG. 14, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network nodes 111, 112, 113, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UEs 120, 121, 122, 123, such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
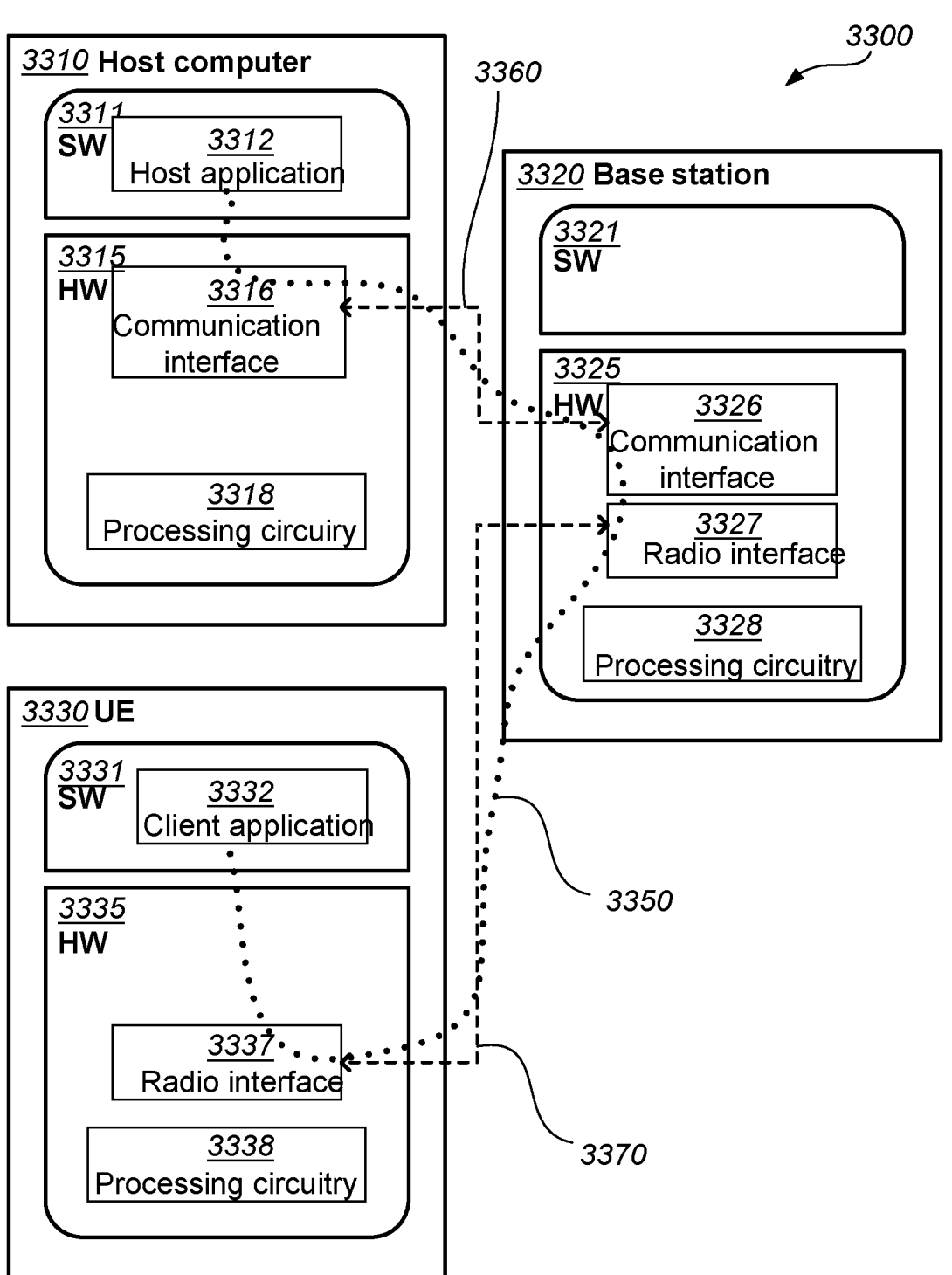
FIG. 15 is a generalized block diagram of a host computer communicating via a base station with a user equipment over a partially wireless connection.
Figures 16, 17:
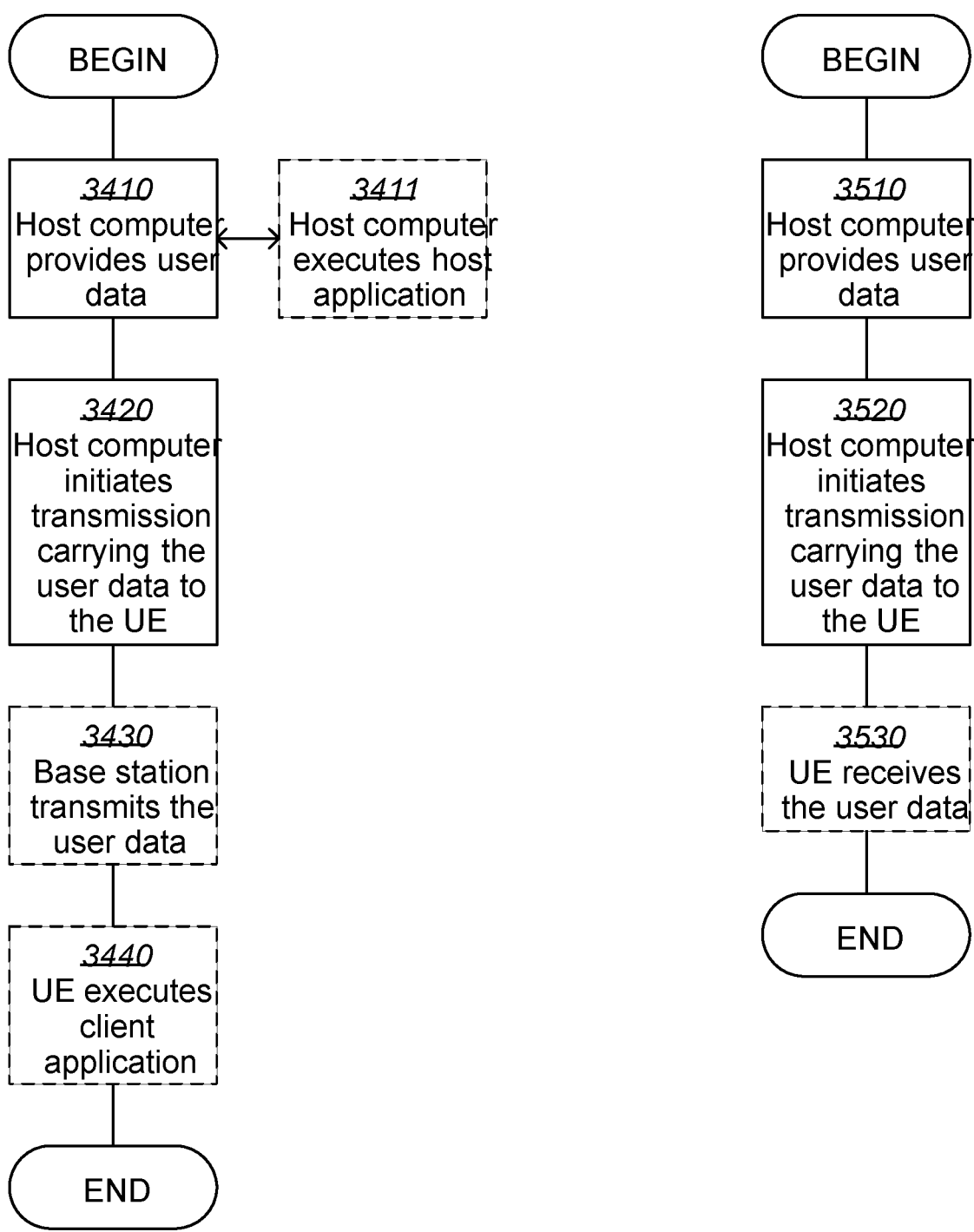
FIGS. 16 to 19 are flowcharts illustrating methods implemented in a communication system including a host computer, a base station and a user equipment.

It is noted that the host computer 3310, base station 3320 and UE 3330 illustrated in FIG. 15 may be identical to the host computer 3230, one of the base stations 3212*a*, 3212*b*, 3212*c* and one of the UEs 3291, 3292 of FIG. 16, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 16 is a flowchart illustrating a method implemented in a communication system, in accordance with one embodiment. The communication system includes a host computer, a base station such as the network node 110, and a UE such as the UE 120, which may be those described with reference to FIG. 14 and FIG. 15. For simplicity of the present disclosure, only drawing references to FIG. 16 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 17 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 17 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 18, 19:
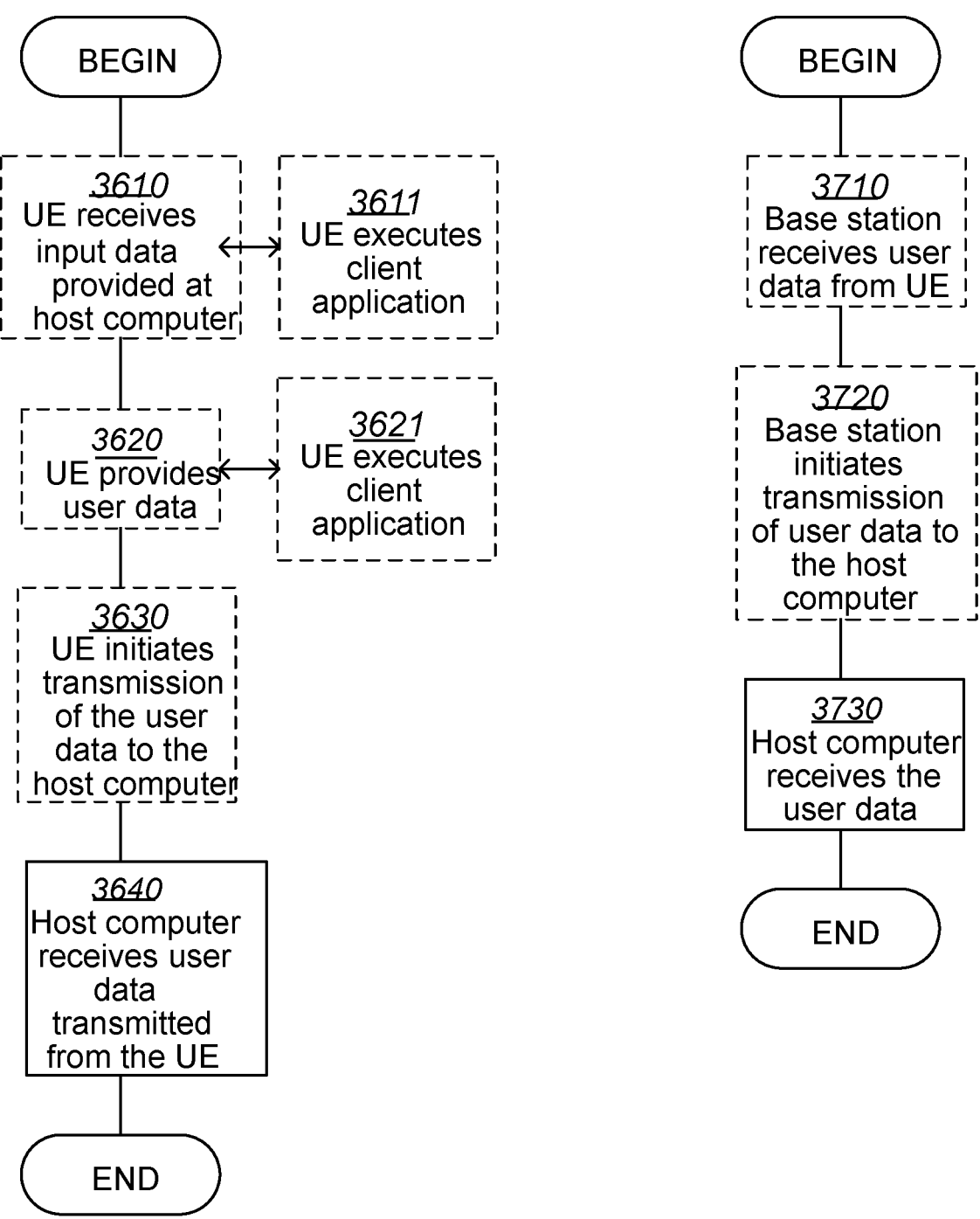

FIG. 18 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 18 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 19 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

Abbreviations

5G Fifth Generation
ACK Acknowledgment
AMF Access and Mobility Management Function BWP Bandwidth Part
CE Control element
CP Cyclic Prefix
CSI-RS Channel State Information Reference Signal
DCI Downlink Control Information
DFN Direct Frame Number
DMRS Demodulation Reference Signal
gNB gNodeB
HARQ Hybrid Automatic Repeat Request
IE Information Element
LTE Long Term Evolution
MAC Media Access Control
MCS Modulation and Coding Scheme
NACK Negative Acknowledgement
NDI New Data Indicator
NR New Radio
OFDM Orthogonal Frequency-Division Multiplexing
PDCCH Physical Downlink Control Channel
PDCP Packet Data Convergence Protocol
PDSCH Physical Downlink Shared Channel
ProSe Proximity-based Services
PSBCH Physical Sidelink Broadcast Channel
PSCCH Physical Sidelink Common Control Channel
PSFCH Physical Sidelink Feedback Channel
PT-RS Tracking Reference Signal
PUCCH Physical Uplink Control Channel
PUSCH Physical Uplink Shared Channel
QoS Quality of Service
RAN Radio Access Network
RB Resource Block
RLC Radio Link Control
RLF Radio Link Failure
RLM Radio Link Monitoring
RNTI Radio Network Temporary Identifier
RRC Radio Resource Control
RRC Radio Resource Control
RSRP Reference Signal Received Power
RSRQ Reference Signal Received Quality
RSSI Received Signal Strength Indicator
RV Redundancy Version
SCI Sidelink Control Information
SCS Sub-Carrier Spacing
SI System Information
SL SideLink
SMF Session Management Function
S-PSS Sidelink Primary Synchronization Signal
SSB Synchronization Signal Block
SSID Sidelink Synchronization Identity
S-SSS Sidelink Secondary Synchronization Signal
UCI Uplink Control Information
UE User Equipment
UPF User Plane Function
The invention claimed is:

1. A method performed by a remote User Equipment (UE) for handling a path switch failure of a connection in a wireless communications network, the method comprising:

detecting the path switch failure, which path switch failure relates to a failure to switch path from a first path to a first network node, to a second path to a second network node, wherein at least one path out of the first path and the second path, comprises an indirect link;

upon detecting the path switch failure, continuing to apply a previous configuration for the connection that was used before a path switch was triggered; and during continuing to apply the previous configuration to recover from the path switch failure, triggering a recovery procedure to continue transmission, during which recovery procedure, the connection for the first path is kept, wherein the triggering the recovery procedure comprises triggering a procedure to establish a direct link with a third network node to continue the trans- mission-er and triggering a procedure to establish an indirect link, via a relay UE, with either the second network node or a third network node to continue the transmission.

2. The method according to claim 1, wherein the path switch failure relates to a failure to switch path:

from a direct link to an indirect link, from an indirect link to a direct link, or from an indirect link to another indirect link.

3. The method according to claim 2, wherein when relating to the first path:

the direct link relates to a direct path between the remote UE and the first network node, the indirect link relates to a path between the remote UE and the first network node via a first relay UE, or both the direct link relates to the direct path between the remote UE and the first network node and the indirect link relates to the path between the remote UE and the first network node via the first relay UE.

4. The method according to claim 2, wherein when related to the second path:

the direct link relates to a direct path between the remote UE and the second network node, the indirect link relates to a path between the remote UE and the second network node via a second relay UE, or the direct link relates to the direct path between the remote UE and the second network node and the indirect link relates to the path between the remote UE and the second network node via the second relay UE.

5. The method according to claim 1, further comprising:

sending to any one or more out of the first network node, the second network node and a third network node, a report message including failure related information for Self-Organizing Network/Minimization of Drive Test (SON/MDT) purposes.

6. The method according to claim 1, further comprising any one or more out of:

when the recovery procedure to continue the transmission fails, entering an idle mode, any two of the first network node, the second network node, and a third network node are a same node, and the first network node, the second network node, and the third network node are a same node.

7. A non-transitory computer-readable storage medium comprising instructions which, when executed by a processor, cause a remote User Equipment (UE) for handling a path switch failure of a connection in a wireless communication network to perform operations comprising:

detecting the path switch failure, which path switch failure relates to a failure to switch path from a first path to a first network node, to a second path to a second network node, wherein at least one path out of the first path and the second path, comprises an indirect link;

upon detecting the path switch failure, continuing to apply a previous configuration for the connection that was used before a path switch was triggered; and during continuing to apply the previous configuration to recover from the path switch failure, triggering a recovery procedure to continue transmission, during which recovery procedure, the connection for the first path is kept, wherein the triggering the recovery procedure comprises triggering a procedure to establish a direct link with a third network node to continue the transmission and triggering a procedure to establish an indirect link, via a relay UE, with either the second network node or a third network node to continue the transmission.

8. The non-transitory computer-readable storage medium according to claim 7, wherein the path switch failure relates to a failure to switch path:

from a direct link to an indirect link, from an indirect link to a direct link, or from an indirect link to another indirect link.

9. The non-transitory computer-readable storage medium according to claim 8, wherein when relating to the first path:

the direct link relates to a direct path between the remote UE and the first network node, the indirect link relates to a path between the remote UE and the first network node via a first relay UE, or both the direct link relates to the direct path between the remote UE and the first network node and the indirect link relates to the path between the remote UE and the first network node via the first relay UE.

10. The non-transitory computer-readable storage medium according to claim 8, wherein when related to the second path:

the direct link relates to a direct path between the remote UE and the second network node, the indirect link relates to a path between the remote UE and the second network node via a second relay UE, or the direct link relates to the direct path between the remote UE and the second network node and the indirect link relates to the path between the remote UE and the second network node via the second relay UE.

11. A remote User Equipment (UE) configured to handle a path switch failure of a connection in a wireless communications network, wherein the remote UE is to:

detect the path switch failure, which path switch failure is adapted to relate to a failure to switch path from a first path to a first network node, to a second path to a second network node, wherein at least one path out of the first path and the second path, is adapted to comprise an indirect link;

upon detecting the path switch failure, continue to apply a previous configuration for the connection that was used before a path switch was triggered; and during continuing to apply the previous configuration to recover from the path switch failure, trigger a recovery procedure adapted to continue transmission, during which recovery procedure, the connection for the first path is kept, wherein the triggering the recovery procedure comprises triggering a procedure to establish a direct link with a third network node to continue the transmission-or and triggering a procedure to establish an indirect link, via a relay UE, with either the second network node or a third network node to continue the transmission.

12. The remote UE according to claim 11, wherein the path switch failure relates to a failure to switch path:

from a direct link to an indirect link, from an indirect link to a direct link, or from an indirect link to another indirect link.

13. The remote UE according to claim 12, wherein when relating to the first path:

the direct link relates to a direct path between the remote UE and the first network node, the indirect link relates to a path between the remote UE and the first network node via a first relay UE, or both the direct link relates to the direct path between the remote UE and the first network node and the indirect link relates to the path between the remote UE and the first network node via the first relay UE.

14. The remote UE according to claim 12, wherein when related to the second path:

the direct link relates to a direct path between the remote UE and the second network node, the indirect link relates to a path between the remote UE and the second network node via a second relay UE, or the direct link relates to the direct path between the remote UE and the second network node and the indirect link relates to the path between the remote UE and the second network node via the second relay UE.

15. The remote UE according to claim 10, further to:

send to any one or more out of the first network node, the second network node and a third network node, a report message adapted to include failure related information for Self-Organizing Network/Minimization of Drive Test (SON/MDT) purposes.

16. The remote UE according to claim 11, further to enter an idle mode, when the recovery procedure to continue the transmission fails.

17. The remote UE according to claim 11, wherein:

any two of the first network node, the second network node, and a third network node are a same node, or the first network node, the second network node, and the third network node are a same node.

\* \* \* \* \*